US006377613B1

(12) United States Patent
Kawabe et al.

(10) Patent No.: US 6,377,613 B1
(45) Date of Patent: Apr. 23, 2002

(54) COMMUNICATION APPARATUS FOR CODE DIVISION MULTIPLE ACCESSING MOBILE COMMUNICATIONS SYSTEM

(75) Inventors: Manabu Kawabe, Fujinomachi; Seishi Hanaoka, Kodaira; Nobukazu Doi, Hachioji, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/422,186

(22) Filed: Oct. 22, 1999

(30) Foreign Application Priority Data

Oct. 23, 1998 (JP) ............................................. 10-301993

(51) Int. Cl.[7] ............................................... H04L 27/30
(52) U.S. Cl. ........................ 375/142; 375/143; 375/150; 375/152; 375/267; 375/343; 370/342; 370/441; 370/479; 370/532; 370/537
(58) Field of Search ................................. 375/140, 141, 375/142, 143, 144, 150, 152, 267, 340, 347, 343; 370/335, 342, 441, 479, 532, 537, 540

(56) References Cited

U.S. PATENT DOCUMENTS

| 5,166,951 A | * | 11/1992 | Schilling ........................ 375/1 |
| 5,887,021 A | * | 3/1999 | Keskitalo et al. ............ 375/200 |
| 6,130,906 A | * | 10/2000 | Davidovici et al. .......... 375/130 |
| 6,160,803 A | * | 12/2000 | Yuen et al. ................... 370/342 |
| 6,163,566 A | * | 12/2000 | Shiino .......................... 375/143 |
| 6,173,008 B1 | * | 1/2001 | Lee .............................. 375/148 |
| 6,181,733 B1 | * | 1/2001 | Shinde ......................... 375/152 |

* cited by examiner

Primary Examiner—Stephen Chin
Assistant Examiner—Dac V. Ha
(74) Attorney, Agent, or Firm—Mattingly, Stanger & Malur, P.C.

(57) ABSTRACT

To simplify the structure of the demodulator and reduce the hardware scale in a code division multiple accessing communication apparatus. A plurality of base band received signals are multiplexed in a time division manner, so that one matched filter executes path searching or a time division multiplexing processing is executed for demodulation in a despreader. Or path searching and demodulation for a plurality of codes are executed with time division multiplexing of outputs from a plurality of code generators.

15 Claims, 20 Drawing Sheets

COMMUNICATION APPARATUS FOR CODE DIVISION MULTIPLE ACCESSING MOBILE COMMUNICATIONS SYSTEM

TITLE OF THE INVENTION

COMMUNICATION APPARATUS FOR CODE DIVISION MULTIPLE ACCESSING MOBILE COMMUNICATION SYSTEM

BACKGROUND OF THE INVENTION

1. Field of the Invention

The present invention relates to a communication apparatus used for a code division multiple accessing (CDMA) mobile communication system.

2. Description of the Related Art

Conventionally, a matched filter or a correlator has been used to demodulate a received spread spectrum signal in a code division multiple accessing (CDMA) mobile communication system. In this case, a transmitted signal from a transmitter side communication apparatus is received by a receiver side communication apparatus via a plurality of paths. Such a superimposed multi-path signal is entered to the matched filter, then a signal corresponding to a received signal intensity of the multi-path signal is output. FIG. 20 shows a communication apparatus which uses a conventional matched filter. A signal received in a carrier frequency band at a receiving antenna 2305 of a receiver side communication apparatus 2300-2 is converted to a base band spread spectrum signal by a radio frequency demodulator 2306, then converted to a digital signal by an A/D converter 2307. The base band digital spread spectrum signal is then despread by a matched filter 2308. The matched filter 2308, used for searching a path, outputs a peak value at timing synchronized with the multi-path signal. The signal from the matched filter 2308 is entered to a peak detector 2309. The peak detector detects a predetermined number of timings at which peak values have a large receiving intensity, then sets the phase of each of spreading codes of the despreaders 2310-1 to n at each peak timing. Each of the despreaders despreads a spread spectrum signal at timing specified by the peak detector 2309 and outputs a signal of a symbol rate. In the despreader 2310, the multiplier 2351 multiplies the spread spectrum signal with a spreading code generated by the code generator 2350, and the adder 2352 adds up the values and the register 2353 accumulates the total value during one symbol period. The signal output of a symbol rate from each despreader 2310 is entered to a rake combiner 2311 so that its phase is adjusted, then the rake-combined signal is output.

The receiver side communication apparatus shown in FIG. 20 performs antenna diversity. Antenna diversity means combining signals received by antennas 2305-1 to k disposed at predetermined pitches, thereby a diversity effect obtained. The signal received at each antenna is processed in the radio frequency demodulator, the A/D converter, and the base band demodulator sequentially, then subjected to diversity combination in the antenna diversity combiner 2338.

In the structure of the communication apparatus shown in FIG. 20, the matched filter is used for path searching and the despreader is used for despreading the spread spectrum signal. In this case, path searching is not always done, but performed at fixed intervals so as to prevent the signal from out of synchronization, thereby adjusting the phase at the despreader 2310.

BRIEF SUMMARY OF THE INVENTION

For such the antenna diversity performed with the use of a matched filter in a conventionalstructure, the antenna diversity has required individual circuits for path diversity combining and antenna diversity combining respectively. Adding to antenna diversity state, when diversity handover state occurs and QPSK is employed as a radio demodulation method, a plurality of received signals must be demodulated simultaneously. In such a case, the conventional configuration has been confronted with a problem that the circuit is expanded significantly in scale.

In order to prevent such a significant circuit expansion, such a circuit as a matched filter has been time-divided for performing path searching. In the case of such a conventional technique, a plurality of received signals or spreading codes are selected sequentially at fixed periods, thereby searching the path of each of a plurality of channels. In this case, however, if the number of path search processings (number of antennas, number of channels, etc.) is increased, the assigned path searching period of each signal also becomes longer, so that the path searching cannot follow up with the time variance of the connected line. Because the number of received signals or spreading codes which can be time-divided is limited such way, a plurality of matched filters have been required and resulted in an expansion of the hardware in scale.

Furthermore, because the despreader must be kept active so as to despread each spread spectrum signal and demodulate the data, the despreader has to be prepared as many as the number of receiving channels, thus resulting in an expansion of the hardware in scale.

Under the circumstances, it is an object of the present invention to reduce such the hardware scale by operating a matched filter or a despreader in a time-division multiplexing manner.

In order to achieve the above object, the present invention provides two methods for a time-division-multiplexing processing of a matched filter.

(1) Time Division Multiplexing of Received Base Band Signals

A plurality of received base band signals are multiplexed in a time division manner, then the time-division-multiplexed signals are subjected to a despreading processing according to an operation clock decided by the number of time division multiplexing processings.

(2) Time Division Multiplexing of Spread Signals

A receiver generates a plurality of spreading codes for a received base band signal, then those spreading codes are selected by an operation clock decided by the number of codes, thereby despreading a plurality of the signals.

Those two methods are independent of each other, and both or either of them can be employed for a matched filter. With such time division multiplexing processings performed as described above, the performance of the matched filter can be improved, thereby reducing the hardware in scale.

Furthermore, because such the time division multiplexing processings are done even in the despreader, the number of despreaders disposed in parallel can be reduced.

As described above, the present invention allows both of a matched filter and a despreader to be shared with a plurality of channels. The matched filter can also share more channels than the conventional method. Furthermore, because the time division multiplexing processing as described above can be also performed on the transmission side, thereby allowing the spreader to be shared by a plurality of channels and reducing the hardware in scale.

DETAILED DESCRIPTION OF THE PREFERRED EMBODIMENTS

Hereunder, some examples of the communication apparatus used for a code division multiplexing accessing mobile communication system of the present invention will be described with the accompanying drawings.

First Embodiment

Figure 1:
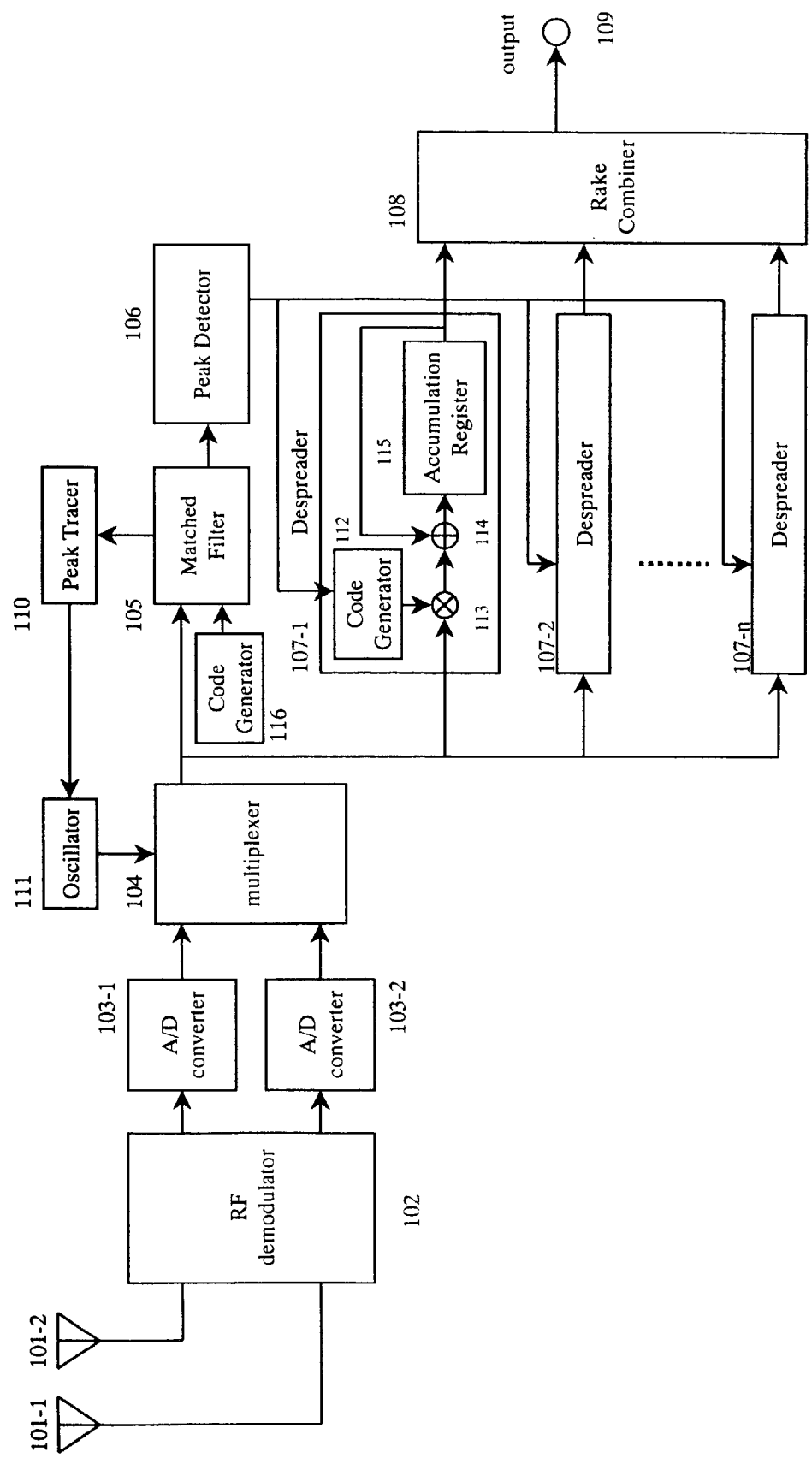
FIG. 1 shows a structure of a receiver provided in a communication apparatus in the first embodiment of the present invention.

FIG. 1 shows a communication apparatus (only the receiver) used for an antenna diversity processing in the first embodiment of the present invention. The number of antennas is not limited to only 2 in this case.

Figure 2:
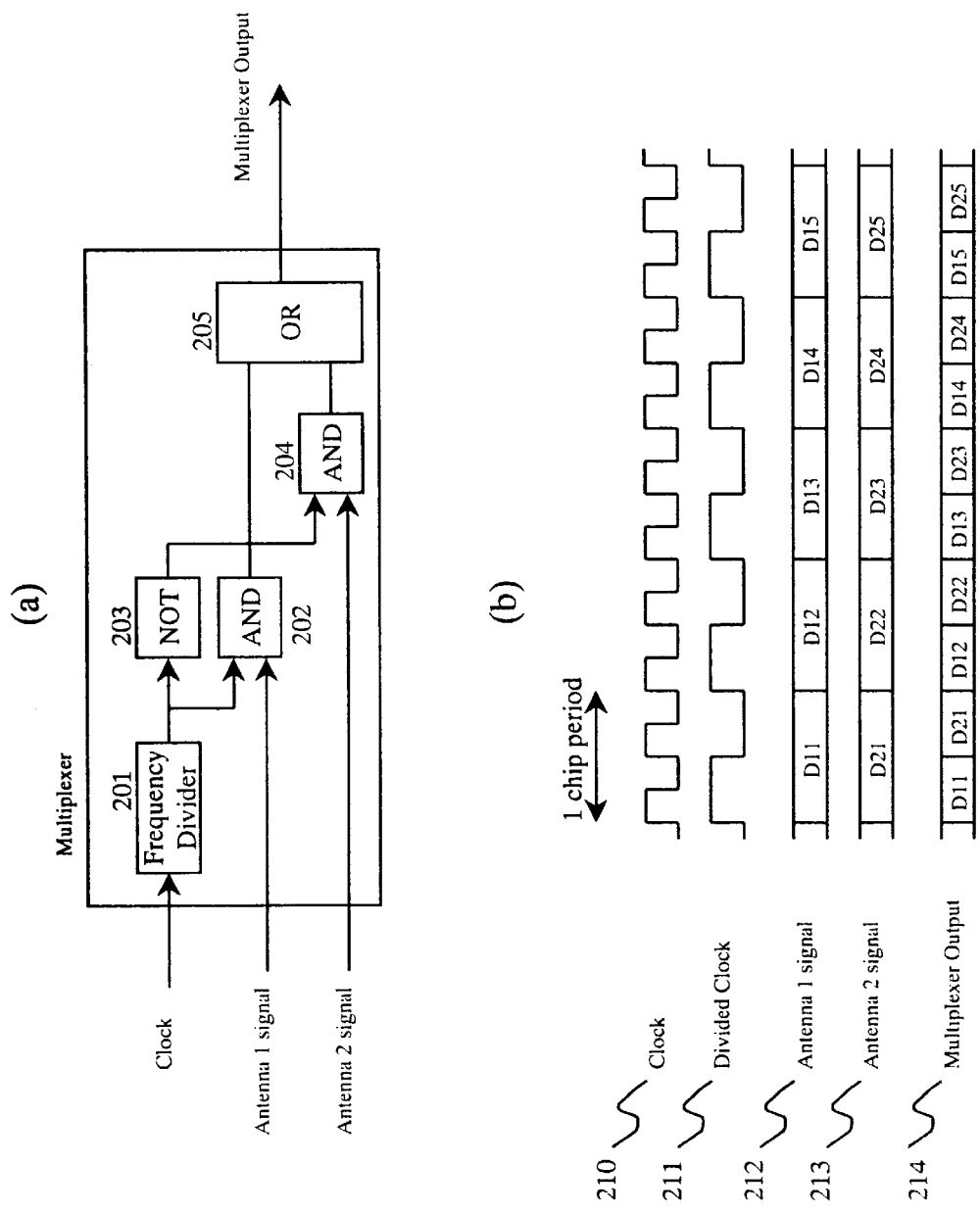
FIG. 2 shows a configuration of a multiplexer and the I/O timing chart in the first embodiment of the present invention.

Carrier frequency band signals received by receiving antennas 101-1 and 102-2 are converted to digital base band spread spectrum signals in a radio frequency demodulator 102 and A/D converters 103-1 and 103-2. The first and second spread spectrum signals received at the antennas 101-1 and 101-2 are entered to a multiplexer 104, then multiplexed into a spread spectrum signal in a time division multiplexing manner. FIG. 2(b) shows the processing sequence.

The multiplexer 104 receives a clock whose frequency is double (n-time frequency if the number of antennas is n) that of the chip rate oscillated from a local oscillator 111. The local oscillator 111 receives a calibration signal from the peak detector 110 and calibrate the oscillation frequency. The calibration detector 110 generates a calibration signal according to the period of a peak value output (a signal received in the same path) at a symbol rate from the matched filter 105. If the communication apparatus in this embodiment is used in a base station, the calibration detector 110 can be replaced with a highly accurate local oscillator, thereby removing the calibration detector 110.

FIG. 2(a) shows a structure of the multiplexer 104. A clock 210 oscillated from the local oscillator 111 is divided by a divider 211, thereby generating a ½-period clock 211. The clock 211 is put into the second AND gate 204 via the first AND gate 202 and an inverter 203. The first spread spectrum signal 212 received from the antenna 101-1 is put into the first AND gate 202 and the second spread spectrum signal 213 received from the antenna 101-2 is put into the second AND gate 203. The output of the first and second AND gates are put out as a multiplexer output 214 via an OR gate 205. Consequently, when the clock 211 is high, the AND gate 202 is opened to put out the first spread spectrum signal 212. When the clock 211 is low, the AND gate 204 is opened to put out the second spread spectrum signal 213. Even when the number of antennas is n, n AND gates are provided and selected sequentially, thereby composing a multiplexer. The use of such a multiplexer makes it possible to obtain a spread spectrum signal 214 (two spread signals are multiplexed in one chiptime). The signal 214 at a chip rate is obtained by applying a time division multiplexing processing to a spread spectrum signal received at each antenna.

Instead of the structure in which the signal is multiplexed after converted into a digitalone, it is also possible to use an analog multiplexer first so as to multiplex both first and second analog spread spectrum signals in a time division manner, and then convert the signals into digital In this case, however, if the chip rate is fast or the number of multiplexed signal is large, the signals should be converted into digital ones before the signals are multiplexed in a time division manner so that the signals are robust to the noises.

Figure 3:
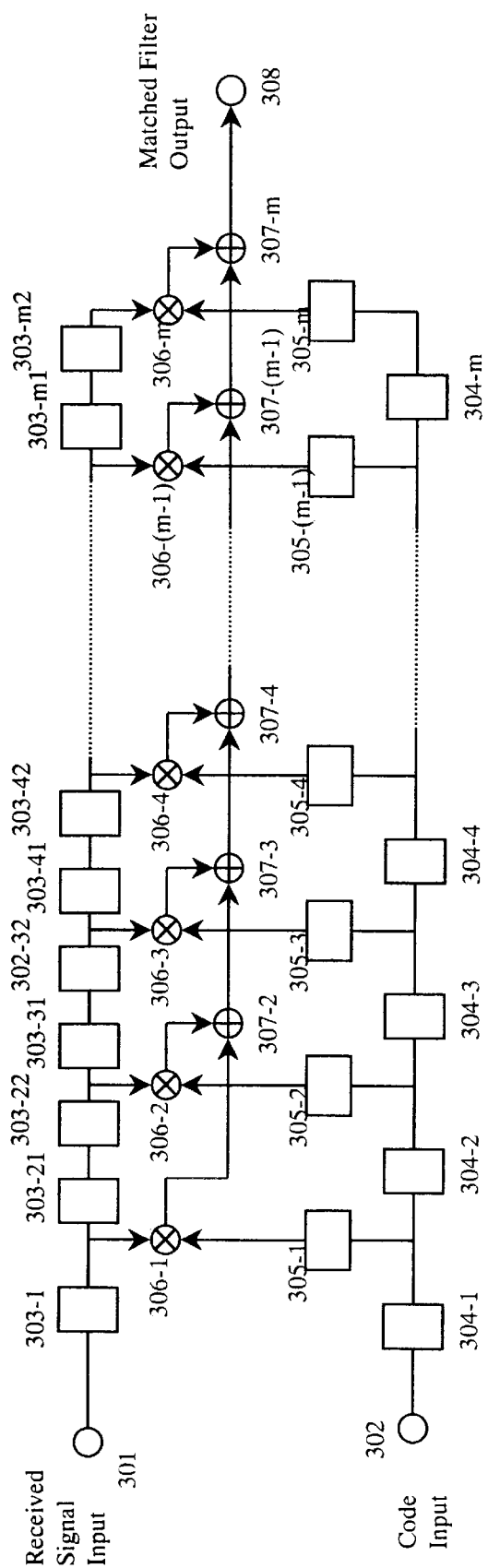
FIG. 3 shows a structure of a matched filter in the first embodiment of the present invention.

The output from the multiplexer 104 is put into the matched filter 105. FIG. 3 shows a structure of the matched filter 105. A spread spectrum signal multiplexed in a time division manner (multiplexed signal) is put into the matched filter 105 from a signal input terminal 301. The spreading code generated in the spreading code generator 116 is put into the matched filter 105 from a code input terminal. The spread spectrum signal multiplexed in a time division manner shifts the receiver shift registers 303-1 to m2 sequentially. In addition, the spreading code shifts the code shift registers 304-1 to m sequentially, then the code is held in the code state registers 305-1 to m. In the matched filter 105, the receiver shift register 303 has a delay element whose time division multiplexing number is 2 per one tap. If the time division multiplexing number is n, a shift register has n delay elements for one tap.

Each of the multipliers 306-1 to 306-m multiplies the value in each of the shift registers 304-1 to 304-k2 (k=2*i ($1 \leq i \leq /2$)) by the value in each of the code state registers 305-1 to 305-m. The result of multiplication is accumulated in each of the adders 307-2 to 307-m, so that a correlation between those values is calculated.

Figure 4:
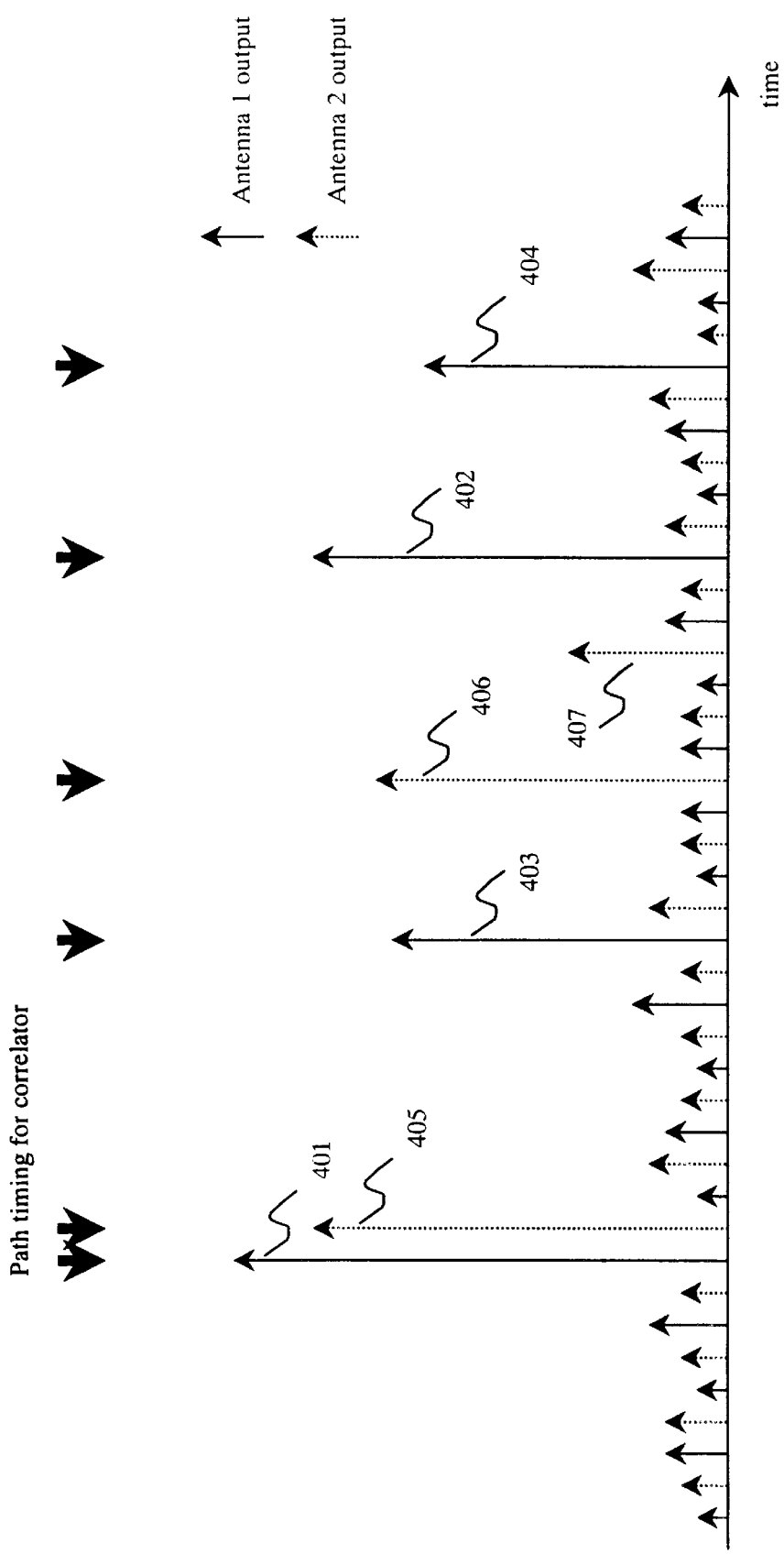
FIG. 4 shows outputs of the matched filter and the detected peaks in the first embodiment of the present invention.

The multipliers 306-1 to 306-m are connected to every other delay element of the receiver shift registers 303-1 and 303-21 to 303-m2, respectively. Consequently, if a multiplex signal 214 is put into the matched filter 105, the output terminal 308 puts out a correlation value corresponding to the first spread spectrum signal (antenna 1) and a correlation value corresponding to the second spread spectrum signal (antenna 2) respectively. FIG. 4 shows how those correlation values are put out from the output terminal 308. The solid line arrow indicates an output of correlation of the signal from the antenna 1 and the broken line arrow indicates an output of correlation of the signal from the antenna 2. As shown in FIG. 4, the correlation values of signals from the antenna 1 and from the antenna 2 are put out alternately (if the number of antennas is n, correlation values of the signals from the antennas 1 to n are put out sequentially). The signals from the terminal 308 are put into the peak detector 106 and selected as many as a predetermined number ($\leq$number of despreaders) in descending order of correlation value. In FIG. 4, timings 401 to 406 shown with the 6 down-arrows are selected. In this case, the timings 401 to 404 are selected on the basis of the signal from the antenna 1, as well as the timings 405 and 406 are selected on the basis of the signal from the antenna 2 respectively.

The timings 401 to 406 are transmitted to the despreaders 107-1 to 107-n respectively. The code generator 112 outputs a spreading code with a phase adjusted to each transmitted timing. The multiplier 113 then multiplies a spreading code by a received signal, then the result is accumulated in both of the adder 114 and the register 115 during one symbol period, thereby a despreading processing is performed. The despreader 107 operates with a clock whose period is ½ of the chip rate (1/n period if the number of antennas is n), thereby received signals are despread correctly.

The signals from the despreaders 107-1 to 1-7-n are put into the rake combiner 108, where the phases of those signals are corrected and the signals are combined. The combined signal is put out from the output terminal 109.

The matched filter can perform both path searching and despreading in another structure. In such a case, the output of the matched filter is put directly into the rake combiner. In this structure, demodulation is always done, thus the operation of the matched filter must be continued nonstop.

In the first embodiment described above, signals from a plurality of antennas are multiplied in a time division manner, thereby those signals from a plurality of antennas are processed in one matched filter 105. In addition, the operation of each of the despreaders 107-1 to 107-n is not fixed by an antenna and timing given by the peak detector 106. Consequently, it is possible to select an antenna to be despread by each despreader 107, as well as select multipath signals when a timing is specified by the peak detector 106. Thus, the antenna diversity circuit can be omitted. Because a signal from any antenna is assigned to a despreader, the conventional antenna diversity circuit can be omitted, thereby the configuration simplifies the circuit structure and obtains the same effect of the antenna diversity.

Furthermore, because a multi-path signal whose receiving intensity is higher can be selected from among multi-path signals from all the antennas for receiving, it is possible to obtain a favorable received sensitivity more effectively than the conventional antenna diversity. In FIG. 4, the timings 401 to 403 are selected for the antenna 1 and the timings 405 to 407 are selected for the antenna 2 in the conventional-strucutre. The multi-path signal corresponding to the timing 404 whose received sensitivity is higher than the multi-path signal corresponding to the timing 407 is not demodulated. Furthermore, if any antenna becomes insensitive to the radio, no demodulated signal is obtained from the despreader connected to an insensitive antenna in the conventionalstructure. On the other hand, in the structure in this embodiment, it is possible to assign all the despreaders to sensitive antennas, thereby operating all the despreaders. Consequently, the structure in this embodiment can obtain a higher performance by eliminating redundant circuits.

Conventionally, in order to reduce the hardware in scale, path searching has been done by selecting a signal output from an antenna and selected signal is put into the matched filter in a time division manner. And, such the path searching to be done at a required accuracy, however, required the matched filter to be operated for a fixed period. In this case, if many antennas are used (like in the second embodiment to be described later), it takes a long time to go to the path searching for the next antenna from one antenna. The number of antennas to be selected is thus limited. On the contrary, because the signal from each antenna is multiplexed in a time division manner in this embodiment, path searching is possible for the signals from a plurality of antennas within a fixed period, and accordingly, it is not limited so much when compared with the operation of the matched filter in a time division manner.

Second Embodiment

Figure 9:
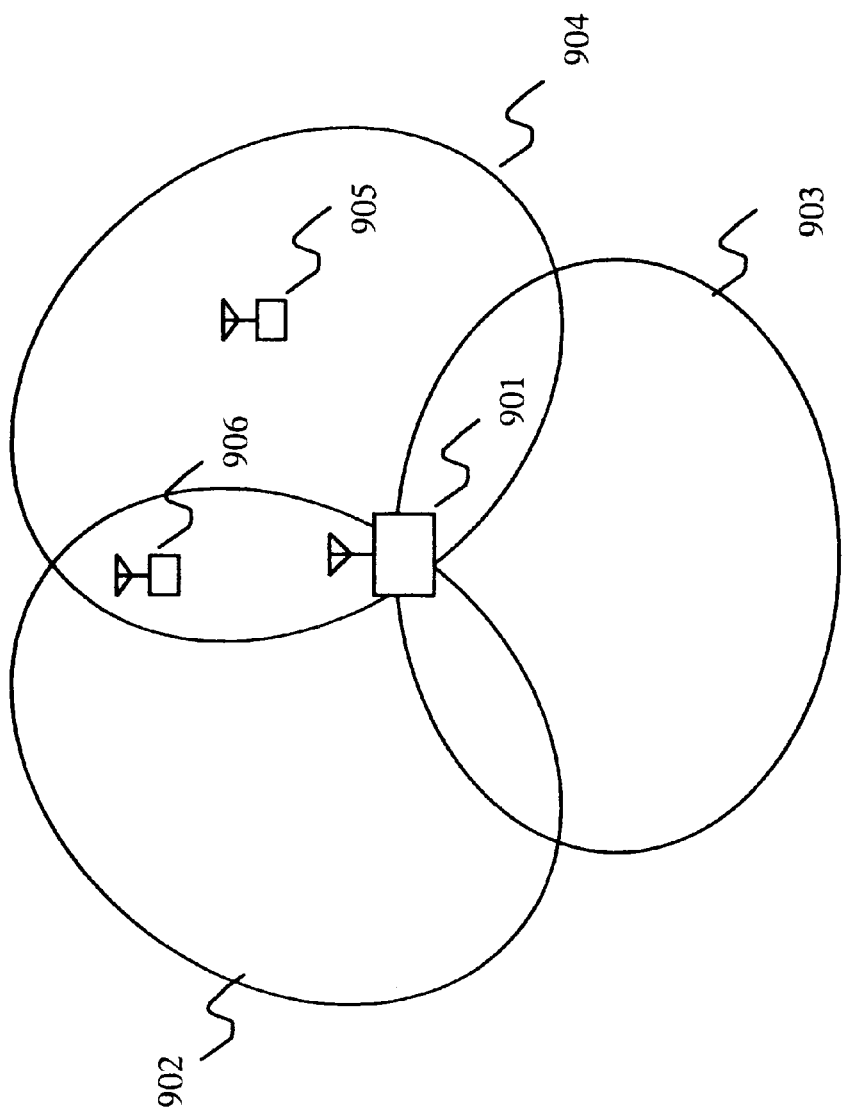
FIG. 9 shows the status of a multi-sector.

A multi-sector means dividing the service range (cell) of a base station into a plurality of sectors. The base station has a directional antenna corresponding to each of those sectors so as to communicate with each mobile station in the sector. FIG. 9 shows an example of such a multi-sector configuration. In FIG. 9, there are three sectors 902 to 904. For example, a signal from a mobile station 905 positioned in the center of the sector 904 is received by the base station 901 via a directional antenna corresponding to the sector 904 of the base station 901. On the other hand, a signal from a mobile station 906 positioned at the boundary between the sectors 902 and 904 is received by the base station 901 via a directional antennas corresponding to the both sectors 902 and 904 of the base station 901 respectively. This operation is referred to as diversity handover.

Figure 5:
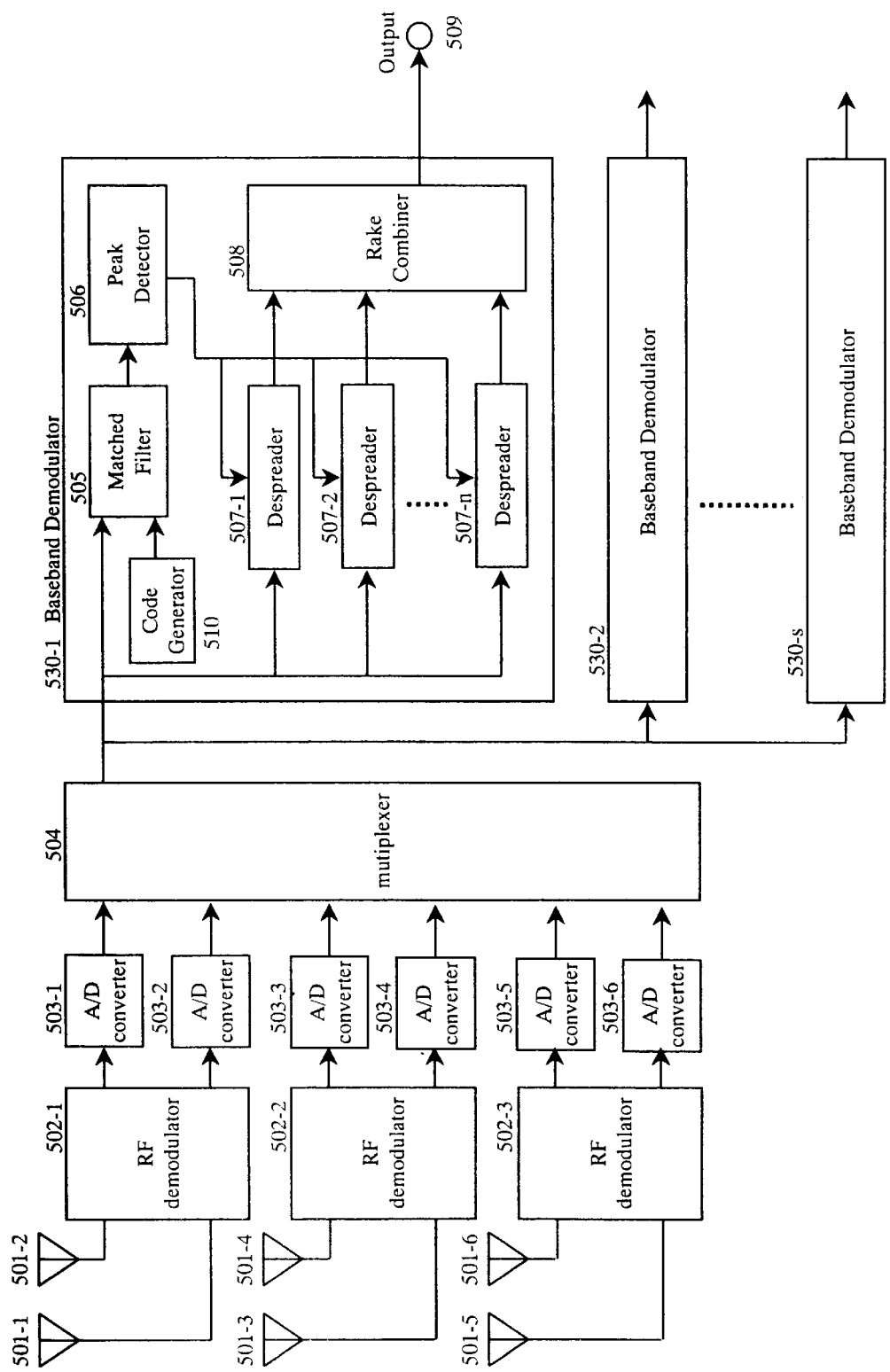
FIG. 5 shows a structure of a receiver of a communication apparatus in the second embodiment of the present invention.

FIG. 5 shows an example of the present invention in which the base station has a multi-sectorstructure. In this case, two antenna diversities are used for each sector, so that one base station has a total of 6 receiver antennas. The number of sectors and the number of antennas are not limited only to those in this embodiment. Each block function in FIG. 5 is the same as the corresponding one in FIG. 1. Thus, detailed description for those functional blocks will be omitted here. A signal received at the receiver antenna of each sector is put into the multiplexer 504 and multiplexed in a time division manner. The output from the multiplexer 504 is put into the s units of base band demodulators 530-1 to 530-s, where s is the maximum number of mobile stations connectable to the base station. Each base band demodulator 530 demodulates a received signal from a mobile station using the spreading code assigned thereto.

Figure 6:
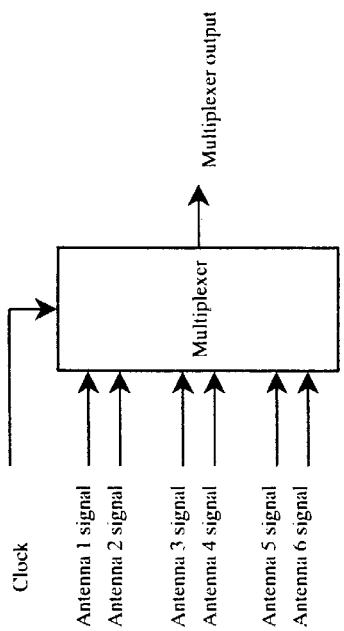
FIG. 6 shows a configuration of the multiplexer in the second embodiment of the present invention and the I/O timing chart of the multiplexer.
Figure 6:
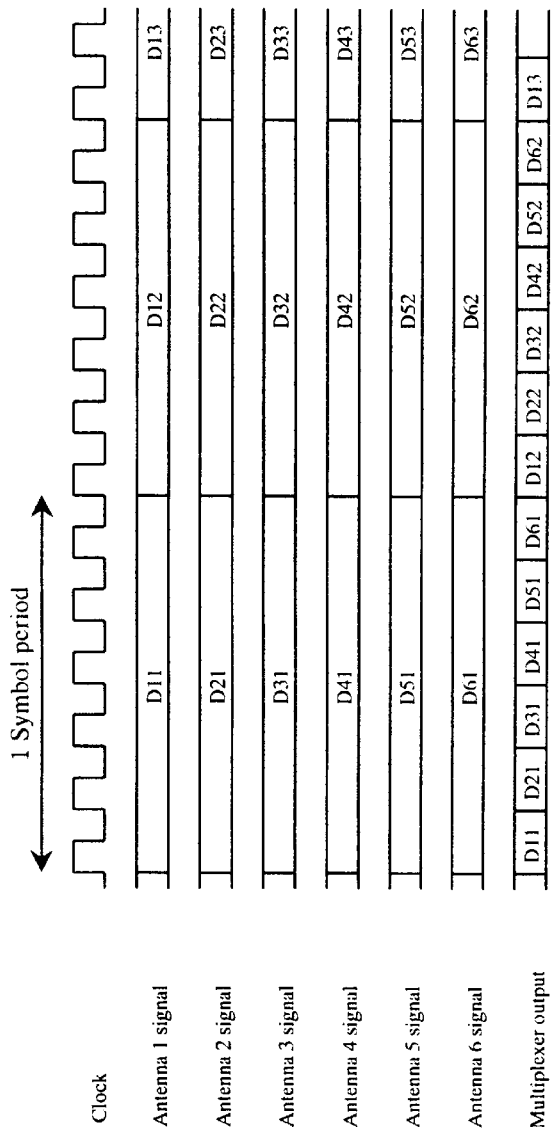

FIG. 6(a) shows an example of a multiplexer and FIG. 6(b) shows an example of a received signal multiplexed in a time division manner. The received signal multiplexed in a time division manner is put into the matched filter 505 of each base band demodulator 530, so that the correlation peak value is detected by the peak detector 506. The multiplexer 504 can be composed just like shown in FIG. 2(*a*)

Figure 7:
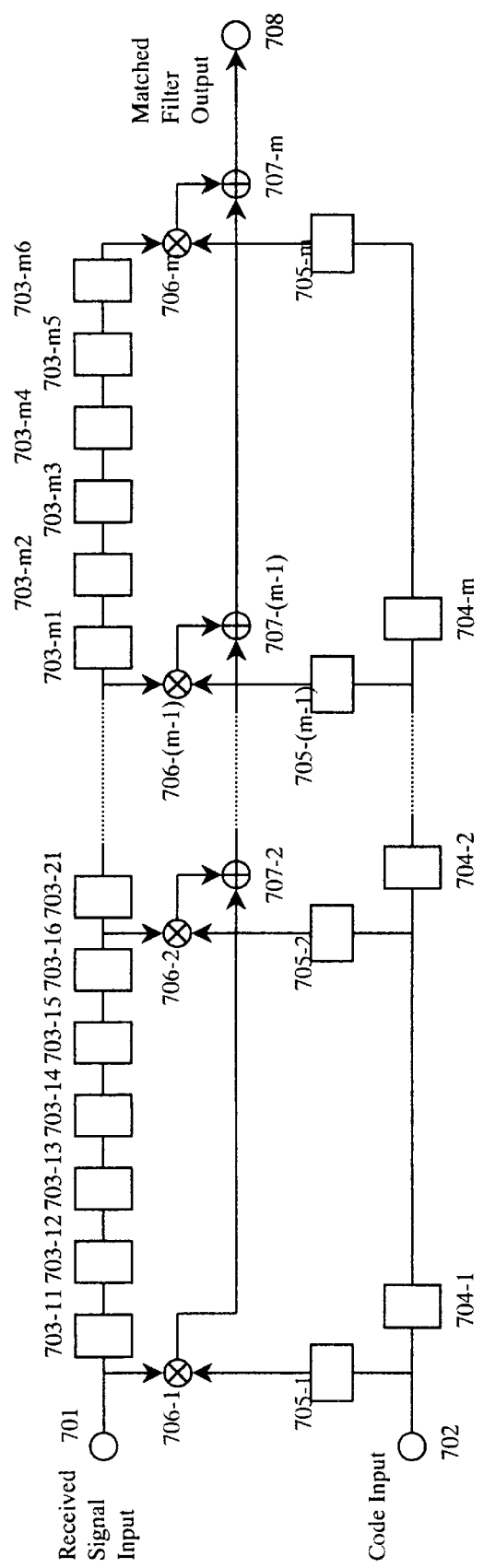
FIG. 7 shows a structure of a matched filter in the second embodiment of the present invention.
Figure 8:
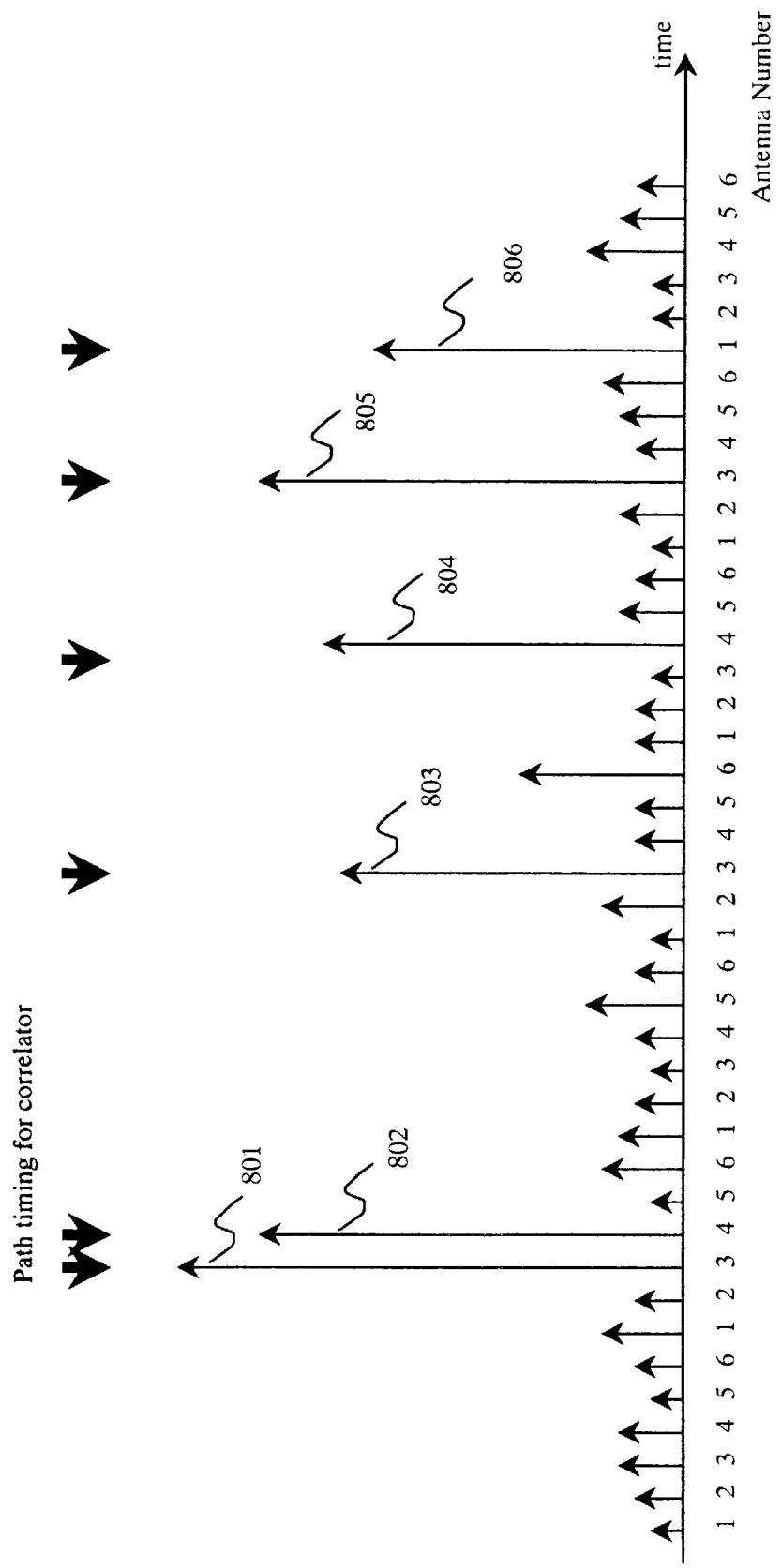
FIG. 8 shows outputs of the matched filter and the detected peaks in the second embodiment of the present invention.

FIG. 7 shows a structure of the matched filter 505. The matched filter 505 is provided with received signal shift registers 703-1 to 703m6, code shift registers 704-1 to 704-m, code status registers 705-1 to 705-m, a multiplier 706, and an adder 707. The operations of those components of the matched filter 505 are the same as the corresponding ones in FIG. 3. However, the matched filter 505 in this embodiment corresponds to 6 antennas, so an output tap is provided to every six delay elements of the receiver shift register 703. The sum of products is thus calculated for received signals from the same antenna. FIG. 8 shows an output example from the matched filter 505. Correlation values are output sequentially in correspondence to the signals received from the antennas 1 to 6, and the peak detector 506 directs each despreader 507 to set a timing for receiving the specified number of multi-path signals in descending order of peak value. If the matched filter receives a signal from a mobile station at a boundary between sectors (mobile station 906 in FIG. 9), the timings 801 to 805 corresponding to the signals received at the antennas 501-3 and 503-4, as well as the timing 806 corresponding to the signal received at the antenna 501-1 are selected.

On the contrary, if a mobile station is positioned in the center of a sector just like the mobile station 905, then only the signal received by the directional antenna (ex., antennas 501-1, 2) corresponding to one sector is demodulated.

Because signals from all the antennas of all the sectors can be demodulated by the matched filter and despreaders in one system as described in this embodiment, if a mobile station is positioned around at a boundary between sectors, it is possible to search a stronger sensitivity path from a plurality sectors and combine the signals. In addition, although a conventional base band demodulator is provided for each sector so that a signal from a mobile station positioned at a boundary between sectors is received by the base band demodulators in two sectors, one base band demodulator can process signals from two sectors in the structure of this embodiment. Thus, the connecting capacity of the base station in this embodiment can be increased much more than the conventional one.

Because a received signal can be taken out from any sector, it is easier to combine sectors and realize a handover between sectors.

The present invention is not limited only to time division multiplexing of received signals from all the sectors; the same effect can also be obtained regardless of the number of sectors and even when signals from several adjacent sectors can be multiplexed collectively in a time division manner depending on the chip rate.

Third Embodiment

In the first or second embodiment, received signals in two systems are multiplexed and demodulated in a time division manner. On the contrary, in the third embodiment, two spreading codes are multiplexed in a time division manner and used to demodulate received signals. Such the demodulation of received signals using a plurality of spreading codes such way is done in the following cases, since each mobile station uses the same frequency band for communications in a CDMA mobile communication system.

(1) When a base station searches a path of each of received signals from a plurality of channels (including a case when in communicating with a plurality of mobile stations assigned with different spreading codes, a plurality of spreading codes are assigned to one mobile station)

(2) When a mobile station searches a path of each of received signals from a plurality of channels (including a plurality of channels corresponding to the base station, a plurality of channels corresponding to a plurality of sectors, and a plurality of channels corresponding to a plurality of base stations)

(3) When the employed radio frequency modulation method is QPSK (Quadrature Phase Shift Keying) or when the base station or each mobile station searches a path of each of received signals spread by spread signals different between In-phase (I) signal and quadrature phase (Q) signal.

Figure 10:
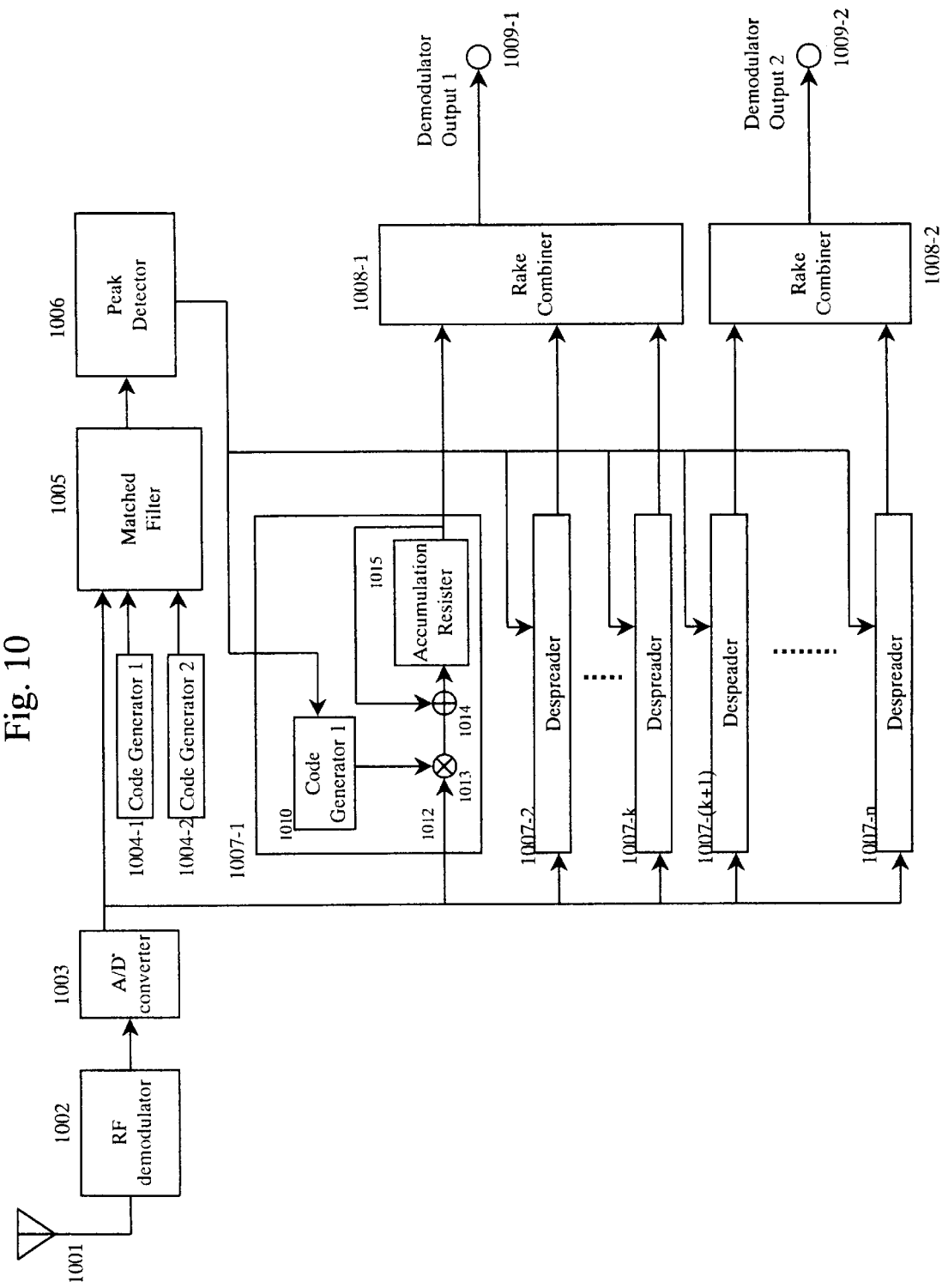
FIG. 10 shows a structure of a receiver of a communication apparatus in the third embodiment of the present invention.

FIG. 10 shows an example of the communication apparatus of the present invention. Each block function in FIG. 10 is the same as the corresponding one in FIG. 1, thus detailed description for those functional blocks will be omitted here. In this embodiment, the matched filter 1005 receives the first spreading code generated from the first code generator 1004-1 and the second spreading code generated from the second code generator 1004-2. The matched filter is provided with two rake combiners 1008-1 and 1008-2 corresponding to these two spreading codes. The first rake combiner 1008-1 receives the output from despreaders 1007-1 to 1007-k and the second rake combiner 1008-2 receives the output from despreaders 1007-(k+1) to n.

Figure 11:
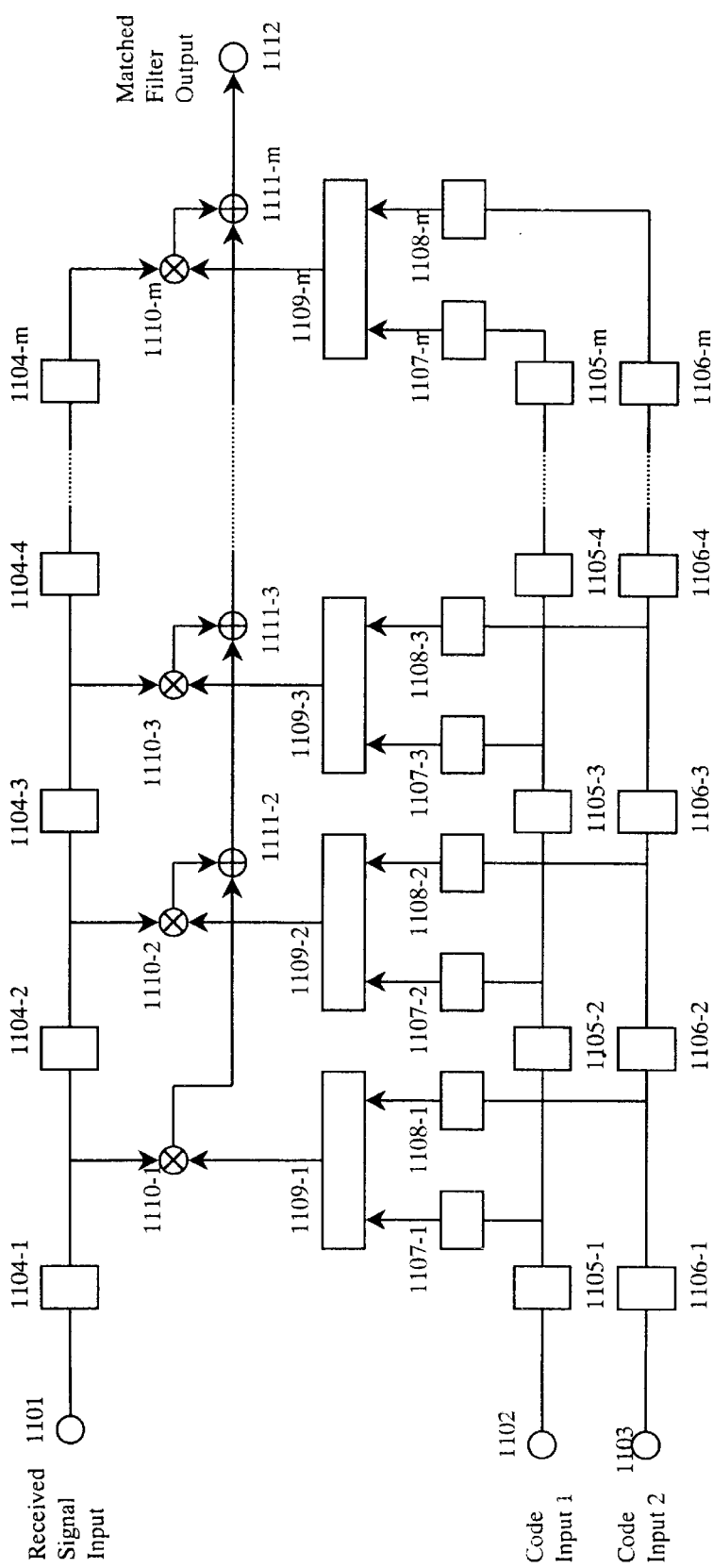
FIG. 11 shows a structure of a matched filter in the third embodiment of the present invention.

FIG. 11 shows a structure of the matched filter 1005. The matched filter 1005 is provided with received signal shift registers 1104-1 to m, the first code shift registers 1105-1 to m corresponding to the first spreading code, the second code shift registers 1106-1 to m corresponding to the second spreading code, the first status registers 1107-1 to m corresponding to the first spreading code, the second status registers 1108-1 to m corresponding to the second spreading code, a multiplier 1110, and an adder 1111. The operations of those components of the matched filter 1005 are the same as the corresponding ones in FIG. 3. However, because the matched filter 105 uses two spreading codes for despreading received signals in this case, selectors 1109 are newly provided. Each selector 1109-i selects the first and second status registers (1107-i, 1108-i) alternately.

Figure 12:
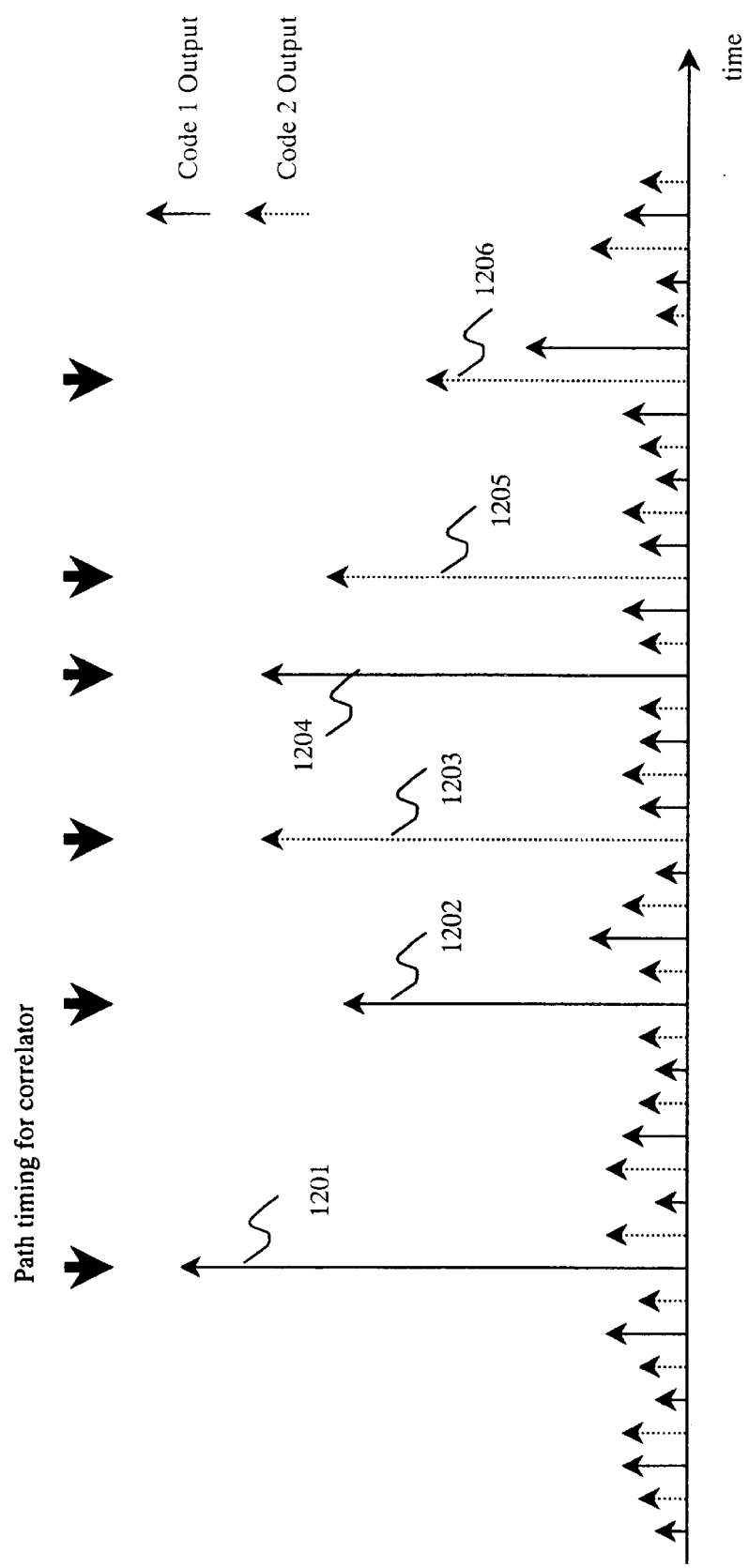
FIG. 12 shows outputs of the matched filter and the detected peaks in the third embodiment of the present invention.

The matched filter 1005 calculates a correlation between the first spreading code and a received signal sample each time when it receives one signal sample, then selects the selector 1109, thereby calculating a correlation with the second spreading code. In addition, the matched filter 1005 selects the selector 1109 and waits for the next sample. FIG. 12 shows an output example from the matched filter 1005. As shown in FIG. 12, the matched filter 1005 outputs a correlation value with the first spreading code and a correlation value with the second spreading code alternately. The output from the matched filter 1005 is put into the peak detector 1006, where a peak timing is detected. The predetermined number of peak timings are selected for both of the first and second spreading codes in descending order of correlation value (peak timings 1201 to 1203 for the first spreading code and the timings 1204 to 1206 for the second spreading code).

The timings corresponding to the first spreading code are assigned to the despreaders 1007-1 to k and the timings corresponding to the second spreading code are assigned to the despreaders 1007-(k+1) to n respectively. For example, to know which of first and second spreading codes corresponds to a peak timing, the selecting timing of the selector 1109 of the matched filter is referenced. The despreader 1007 despreads each received signal with the phase corresponding to the given peak timing. The output from a despreader corresponding to the first spreading code is put into the first rake combiner 1008-1 and the output from a despreader corresponding to the second spreading code is put into the second rake combiner 1008-2. The rake combiner 1008, after the phase is corrected, rake-combines and outputs signals.

Because one matched filter can demodulate signals received from a plurality of channels as described above, this embodiment can reduce the circuit in scale. In addition, even when there are two or more spreading codes, this embodiment, which uses a matched filter provided with the same number of selectors as the number of codes, can multiplex a plurality of received signals in a time division manner.

Furthermore, the first and second embodiments can be combined, thereby making path searching for a plurality of received base band signals using a plurality of spreading codes. In such a case, a multiplexer may be provided just after the A/D converter 1003 (like the configuration shown in FIG. 6). The multiplexer is used to multiplex digital spread spectrum signals received at a plurality of antennas. Such a structure will be effective for searching the path of each of a plurality of received signals using a plurality of spreading codes (when a terminal provided with a plurality of antennas searches a signal from the base station, when the base station searches the paths of each of a plurality of terminals positioned between sectors, etc.).

Fourth Embodiment

Figure 13:
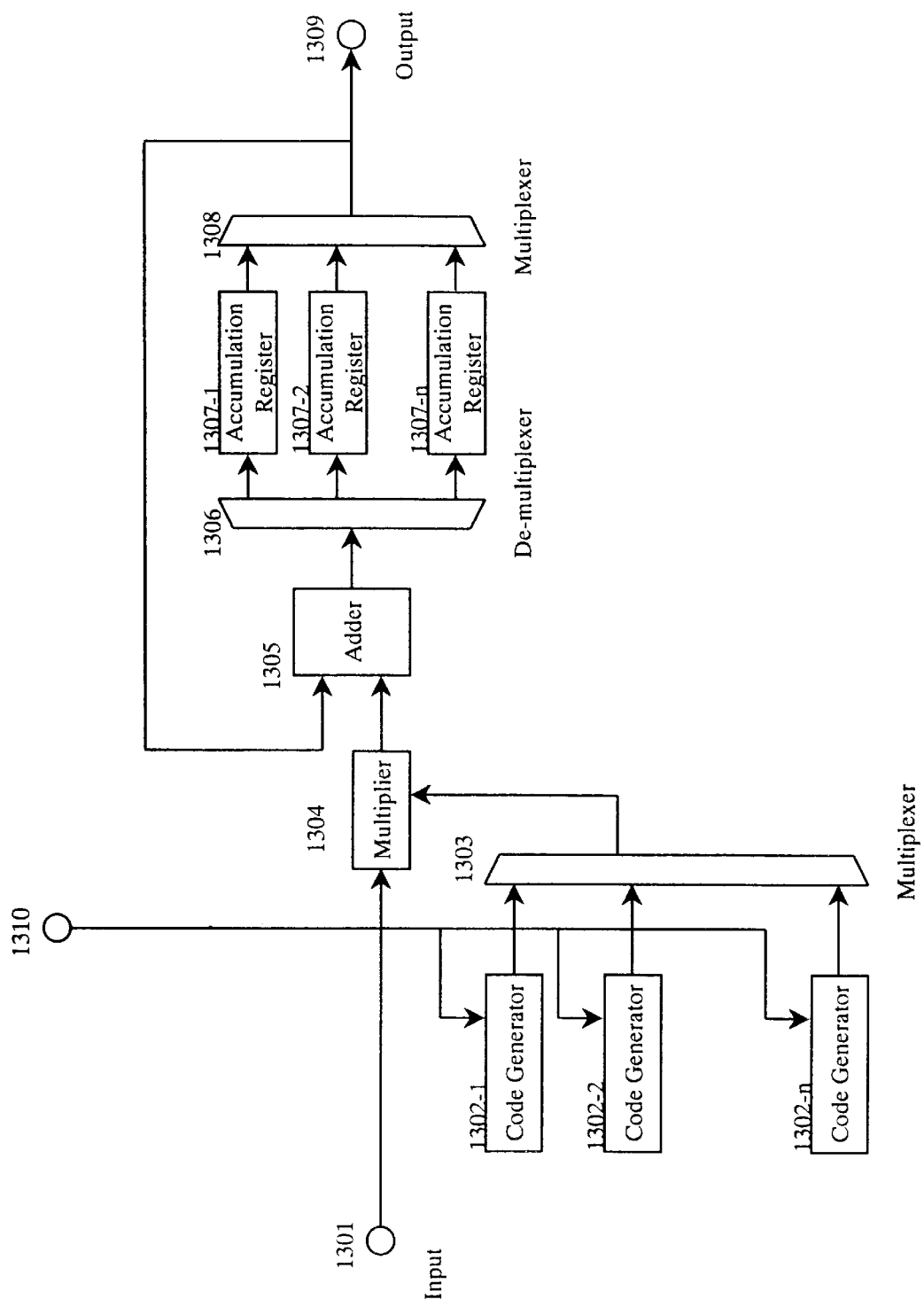
FIG. 13 shows a structure of a despreader of a code division multiple accessing demodulator in the fourth embodiment of the present invention.
Figure 14:
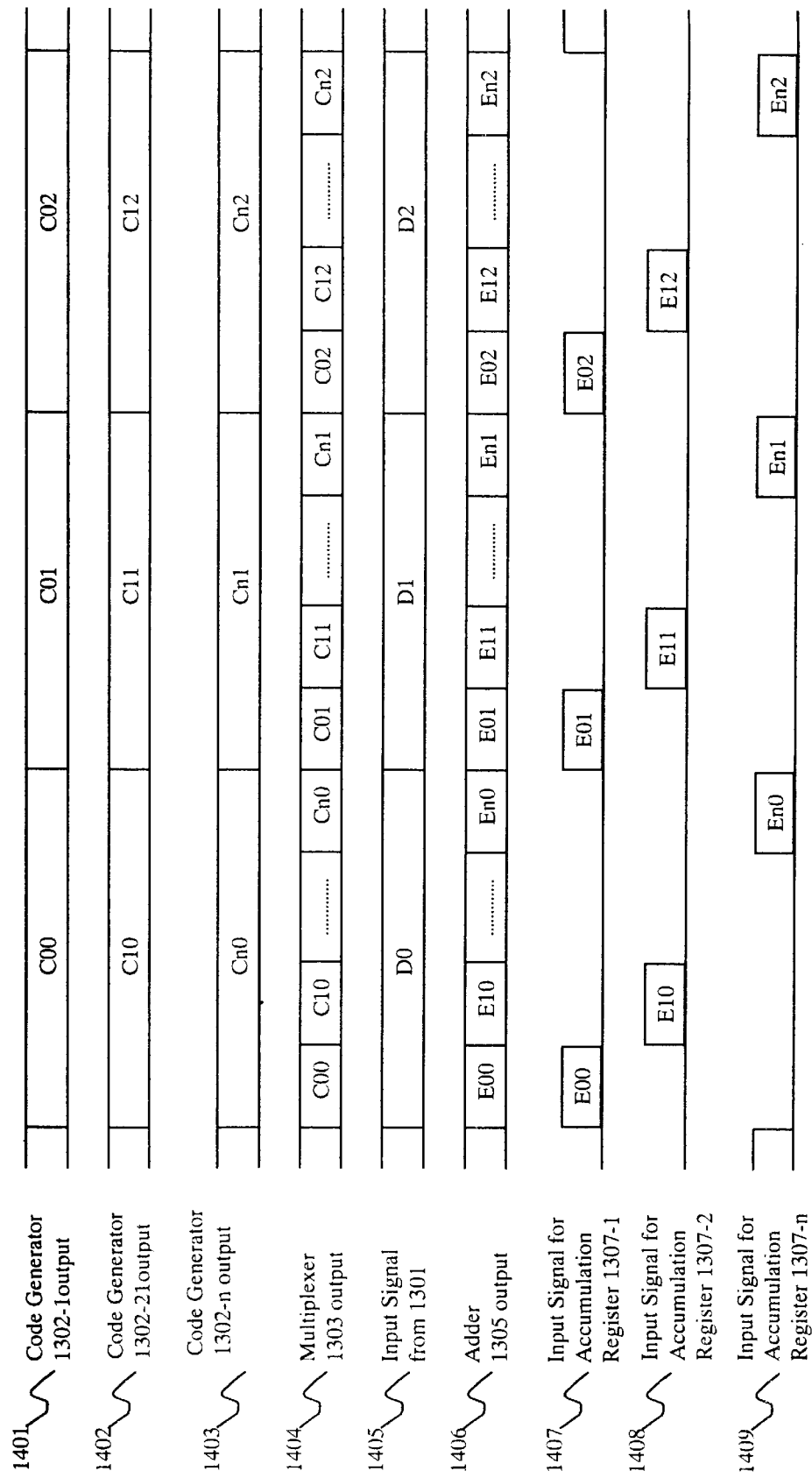
FIG. 14 shows the operation of the code division multiple accessing demodulator in the fourth embodiment of the present invention.

FIG. 13 shows a structure of a despreader which despread a plurality of channels in a time division manner. This fourth embodiment can apply to any of the communication apparatuses in the first to third embodiments described above. For example, for the communication apparatus shown in FIG. 1, the despreaders 107-1 to n may be replaced with the despreader in this embodiment. In this fourth embodiment, received signals, that are spread using a plurality of spreading code and superimposed, are demodulated in a time division multiplexing manner. FIG. 14 shows operation timings of the despreader in this embodiment.

The received signals (the signal output from the multiplexer 104 shown in FIG. 1 and the signal output from the A/D converter 1003 shown in FIG. 10) are put into the despreader from an input terminal 1301. Each of the code generators 1302-1 to n generates a spreading code corresponding to a channel at timing detected by the peak detector and with a specified phase. The spreading code (1401 to 1403) generated from each of the code generators 1302 is multiplexed by the multiplexer 1303 in a time division manner (multiplexer output is 1404). The spreading code 1404 multiplexed in a time division manner is multiplied by a received signal 1405 in the multiplier 1304, then added up and accumulated in the adder 1305, thereby it is despread. Because the accumulated data 1406 is multiplexed in a time division manner, the demultiplexer 1306 decomposes and distributes the accumulated data into channels and held in the registers 1307-1 to n. The multiplexer 1308 selects the registers 1307-1 to n sequentially, thereby accumulating the output from the adder for each channel. After signals are accumulated for one symbol section, the result of despreading is output to the rake combiner via the output terminal 1309. The rake combiner separates the result of despreading multiplexed in a time division manner and rake-combines the data in correspondence to each spreading code.

As described above, the sum of products is calculated for between signals received from the input terminal 1301 at a time and the spreading codes generated by the code generators 1302-1 to n in a time division multiplexing manner. The registers 1307-1 to n are already initialized at this time. Because received signals are despread using a plurality of spreading codes, if the multiplexer 1303 selects, for example, the output from the code generator 1302-I and multiplies and accumulates signals, the demultiplexer 1306 and the multiplexer 1308 always select the register 1307-i. In other words, the demultiplexer 1306 and the multiplexer 1308 operate so that the result of addition is held in a register for each spreading code. After a calculation (multiplication/addition) for a spreading code (1 to n) is ended for one chip, the calculation for the next chip is repeated for each of the spreading codes 1 to n. After a calculation is ended for one symbol section, the values held in the registers 1307-1 to n are output to the output terminal 1309 sequentially through the multiplexer 1308. Then, the registers 1307-1 to n are cleared and the calculation for the next symbol is started in the same way.

As described above, in this embodiment, a plurality of channels are demodulated in a time division multiplexing manner, thereby reducing the hardware required for the demodulation in scale.

Fifth Embodiment

This fifth embodiment is a variation of the fourth embodiment. In this fifth embodiment, the code generators 1302-1 to n of the despreaders in the fourth embodiment are replaced with a demultiplexer 1505, status registers 1502-1 to n, and a multiplexer 1503. A timing detected by the peak detector is specified for the status registers 1502-1 to n and the code generator 1504 generates a spreading code corresponding to a channel with a specified phase. Each block function shown in FIG. 15 is the same as the corresponding one shown in FIG. 13, thus detailed description for that will be omitted here.

Just like in the fourth embodiment, the sum of products is calculated for between signals received at a time from the input terminal 1401 and a spreading code corresponding to a channel in a time division multiplexing manner. In addition, a status register (1402-1 to n) is selected for each code generator 1404 in this embodiment, so that the calculation is made in a time division multiplexing manner, thereby generating a spreading code for each channel.

Figure 15:
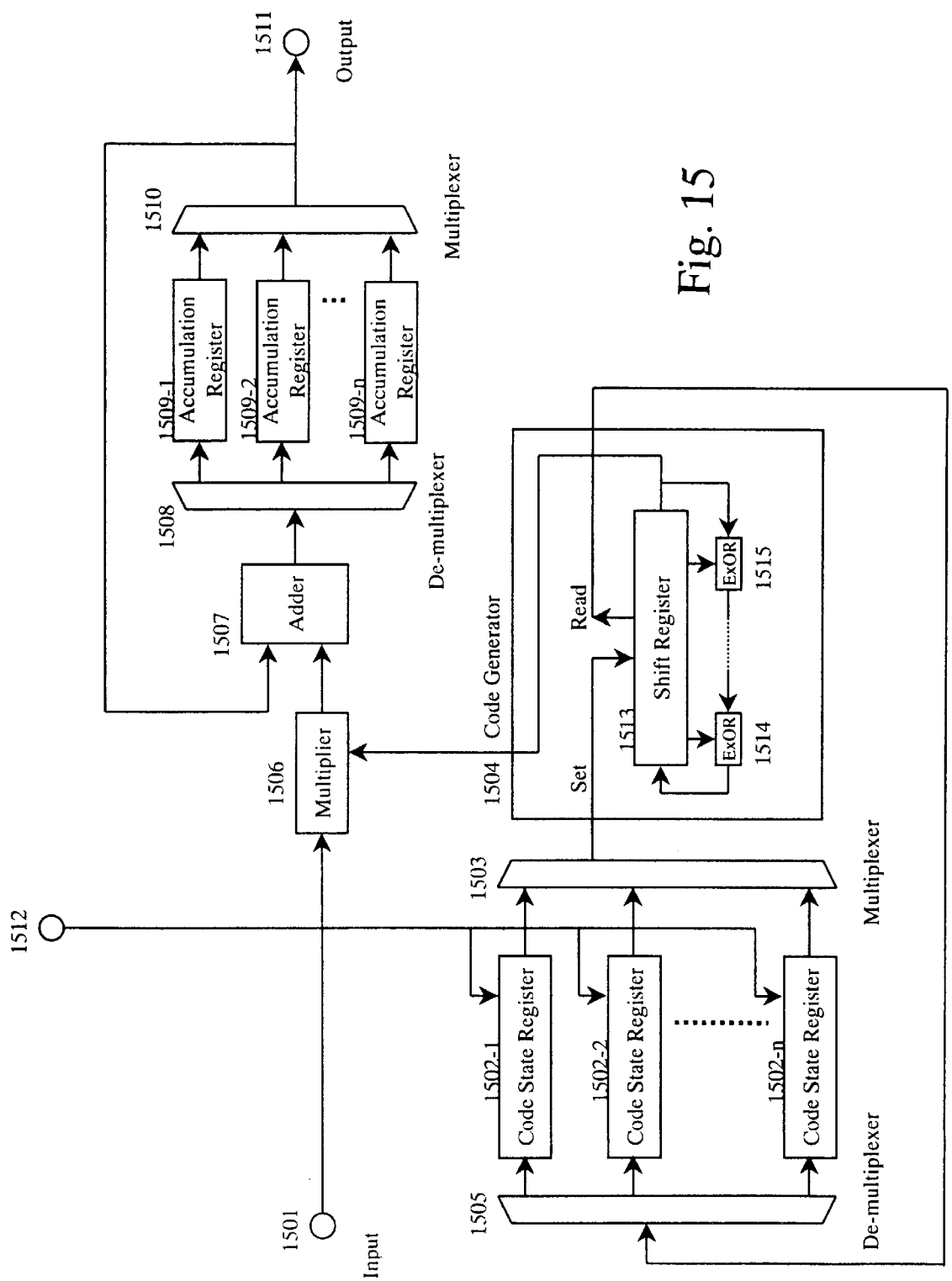
FIG. 15 shows a structure of a despreader of a code division multiple accessing demodulator in the fifth embodiment of the present invention.

FIG. 15 shows a general structure of the code generator 1504.

Sixth Embodiment

Figure 16:
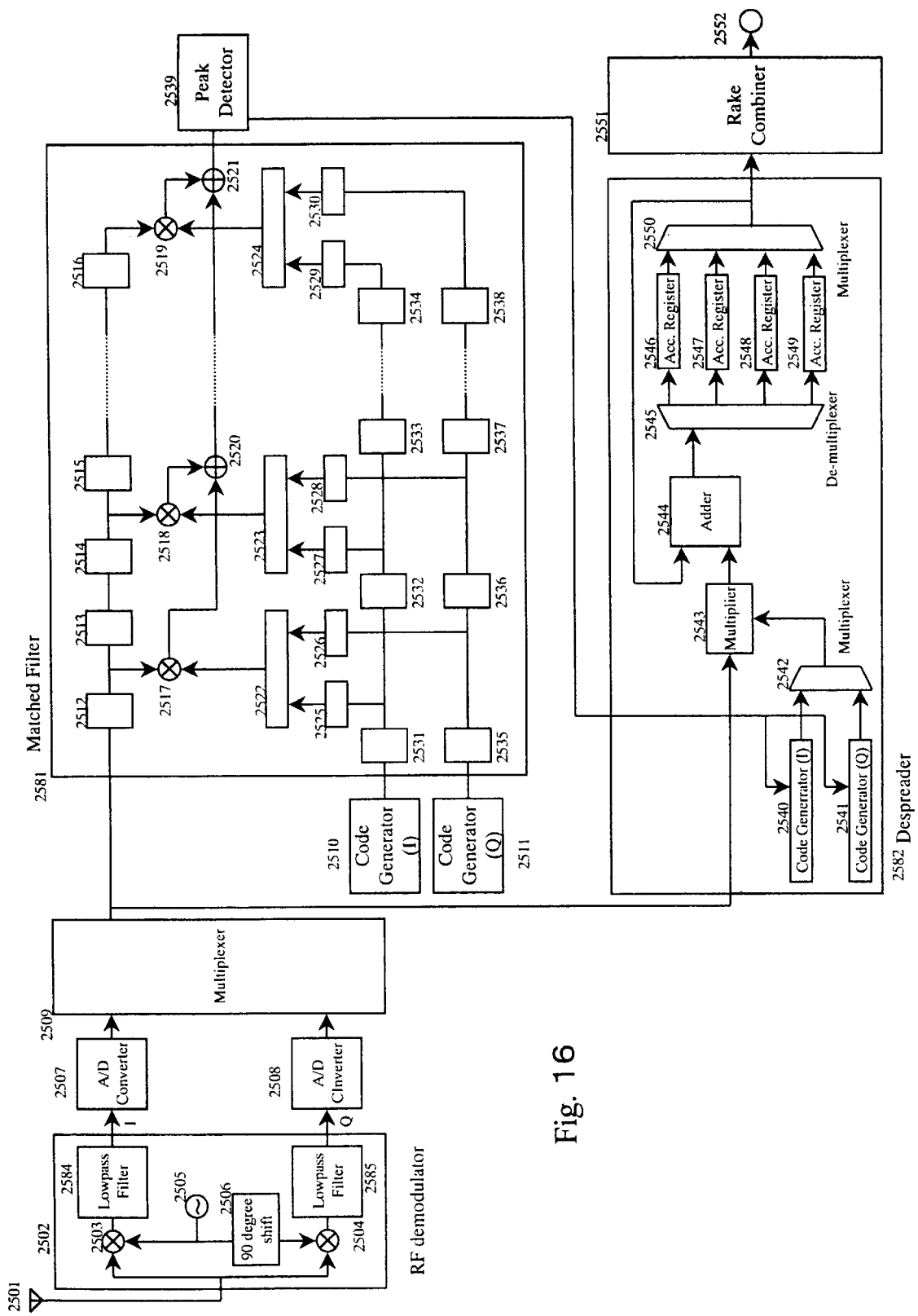
FIG. 16 shows a structure of a demodulator of a code division multiple accessing demodulator in the sixth embodiment of the present invention.

If the employed radio frequency modulation method is QPSK (Quadrature Phase Shift Keying), base band spread spectrum signals are divided into an In-phase (I) signal and a quadrature-phase (Q) signal. These two base band signals can be multiplexed and demodulated, thereby reducing the hardware in scale. FIG. 16 shows such a structure. Each block function shown in FIG. 16 is the same as the corresponding one shown in FIG. 1, thus detailed description for that will be omitted here.

In QPSK, the I signal and the Q signal are transmitted by carriers whose phases are shifted by 90° from each other. Consequently, the receiver side communication apparatus demodulates both I and Q signals to base band spread spectrum signals using a carrier frequency from oscillators 2505 and a frequency shifted from the carrier frequency shifted by 90° at a phase-shifter 2506. Both I and Q signals are thus demodulated to spread spectrum signals in the base band. However, the spread spectrum signals output from the low-path filters 2584 and 2585 will generate phase errors due to the phase rotation in the transmission path, a frequency error of the oscillator, etc. On the other hand, it is known well that phase corrected I and Q signals can be extracted through four calculations (hereafter, to be described as (II), (IQ), (QI), and (QQ)) for the sum of products (I signal×I code, I signal×Q code, Q signal×I code, Q signal×Q code).

Figure 17:
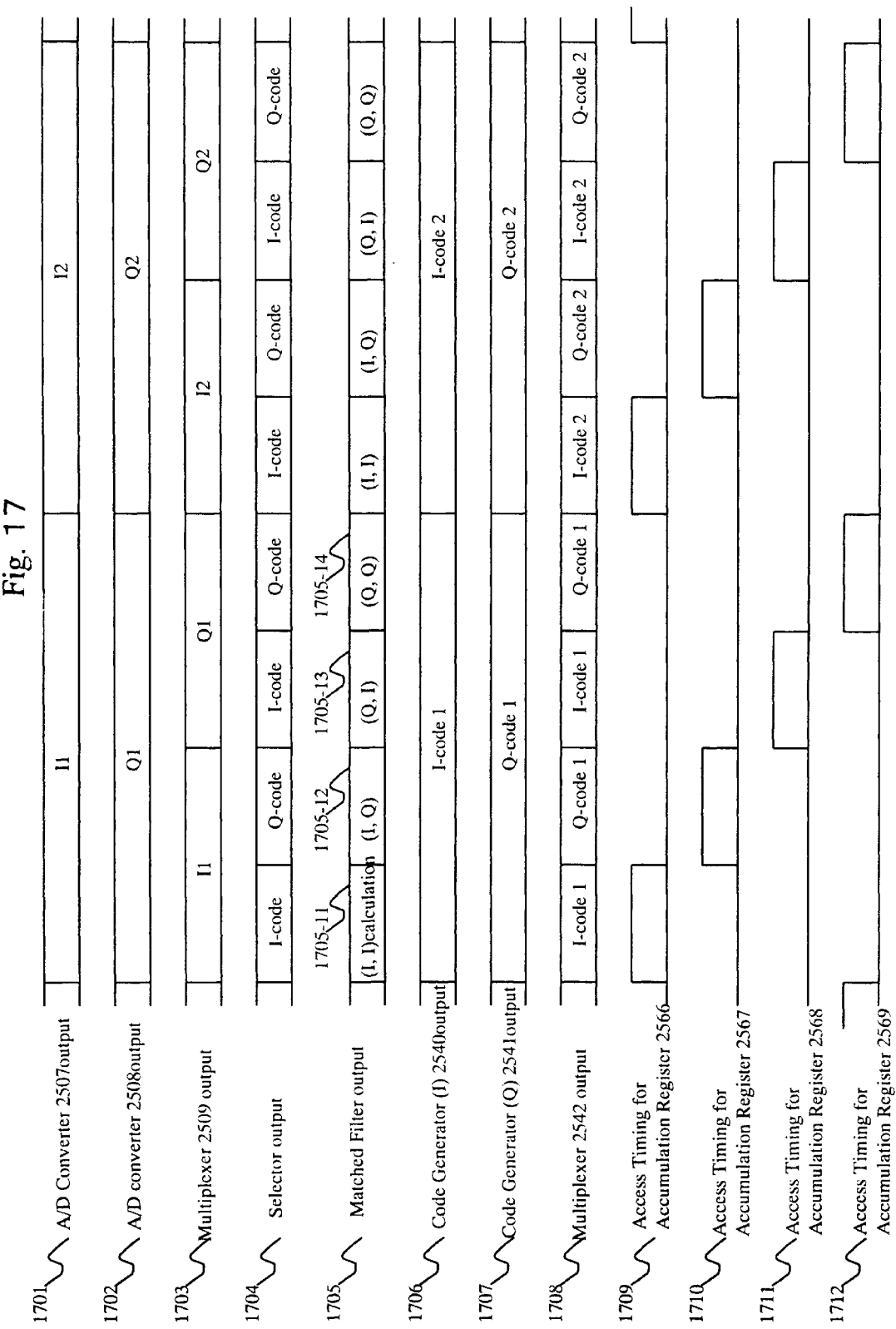
FIG. 17 shows the I/O timing chart of the sixth embodiment of the present invention.

The I and Q signals output from each of the low-path filters 2584 and 2585 are converted from analog signals to digital signals, then put into the multiplexer 2509. I and Q signals are multiplexed by the multiplexer 2509 in a time division manner. FIG. 17 shows how those I and Q signals are multiplexed. Both I and Q signals 1701 and 1702 put into at a chip rate are multiplexed in a time division manner and output as a spread spectrum signal 1703.

The structure of the matched filter 1581 is the same as that of the matched filter shown in FIG. 11. The results of the four calculations for the sum of products 1705-11 to 14 are output from the matched filter at a chip rate. The output from the matched filter 2581 is then put into the peak detector 2539. The peak detector 2539 calculates a receiving power from the correlation value of each received timings. A receiving power is calculated from $((II)+(QQ))^2+((IQ)-(QI))^2$. A receiving power is calculated at a chip rate as described above, then a peak of a larger received power is selected and its timing is transmitted to each despreader 2582.

Hereunder, the operation of the despreader 2582 will be described. Receiving a peak timing from the peak detector 2539, the I code generator 2540 and the Q code generator 2541 generate spreading codes 1706 and 1707 used for despreading signals at the timing. Both I and Q codes are multiplexed by the multiplexer 2542 in a time division manner, then multiplied by a base band received signal which is multiplexed in a time division manner in the multiplier 2543. Consequently, four multiplications are performed in a time division multiplexing manner.

If the multiplexer 2509 outputs an I signal, the multiplexer 2542 selects an I code. The multiplier 2543 calculates (II) and the result is held in the register 2546. The multiplexer 2545 and the demultiplexer 2550 select the register 2546 only when a (II) calculation is made. Next, the multiplexer 2542 selects a Q code. Then, the multiplier 2543 calculates (IQ) and the result is held in the register 2547. The multiplexer 2545 and the demultiplexer 2550 select the register 2547 only when an (IQ) calculation is made. After that, the multiplexer 2509 outputs a Q signal. The above sequence is repeated until the four types of calculations for the sum of products are completed. The results are accumulated in the registers 2546 to 2549 respectively. When the results are accumulated for one symbol period, the four accumulated values held in the registers 2546 to 2549 are transferred to the rake combiner 2551.

In this embodiment, spread spectrum signals, after the QPSK operation, are subjected to four types of calculations for the sum of products. The four types of calculations are performed by the matched filter 2581 and the despreader 2582 in a time division multiplexing manner, thereby reducing the hardware scale of the apparatus.

Especially because a phase shift occurs between I and Q signals if they are received at different times, it is impossible to calculate a correlation between the I and Q signals in a matched filter in a time division manner. This is why each signal/code is multiplexed in a time division manner in this embodiment, thereby reducing the hardware scale of the apparatus. This method is especially effective for the above object.

Seventh Embodiment

Figure 18:
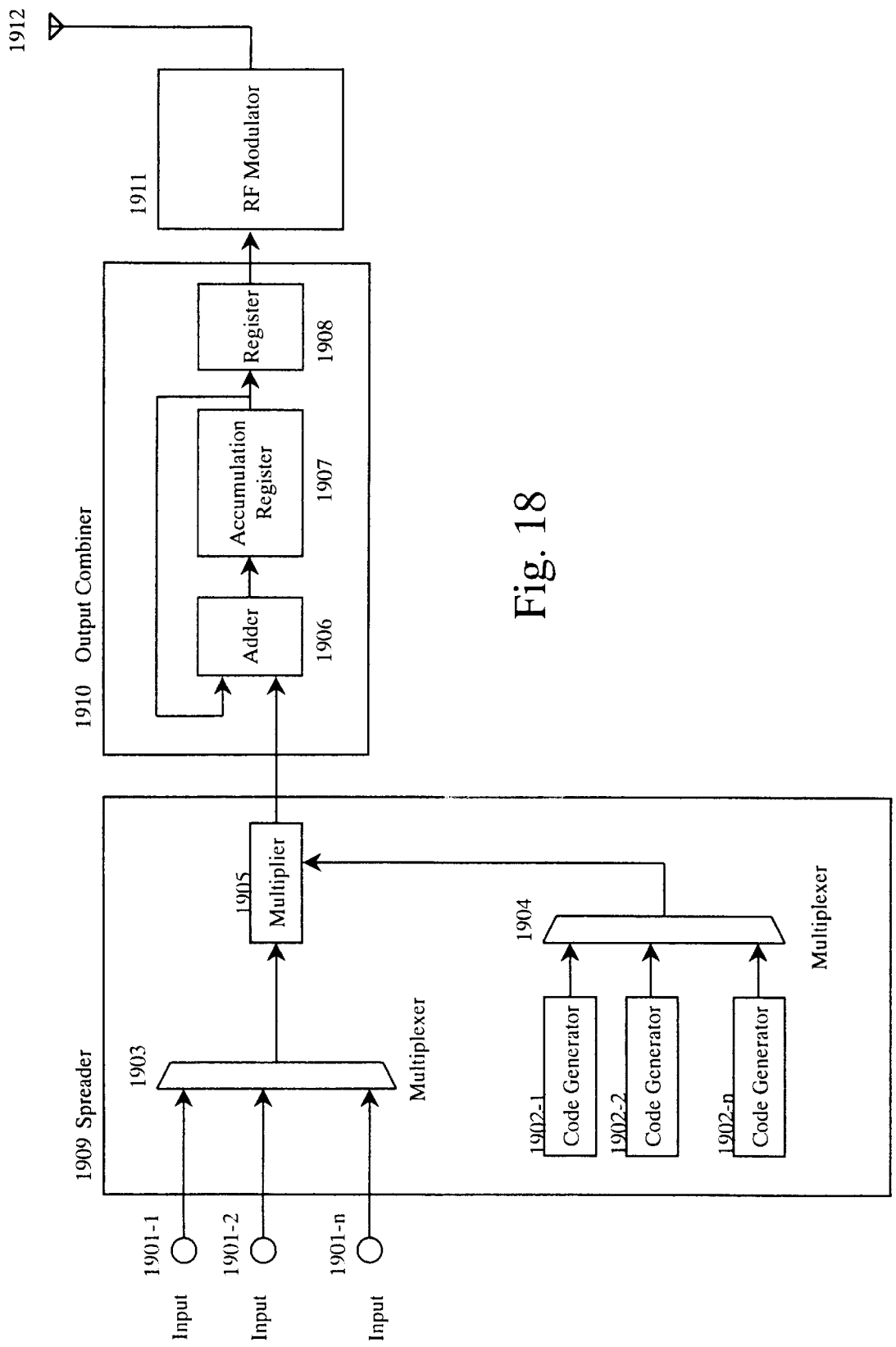
FIG. 18 shows a structure of a transmitter provided in a communication apparatus in the seventh embodiment of the present invention.
Figure 19:
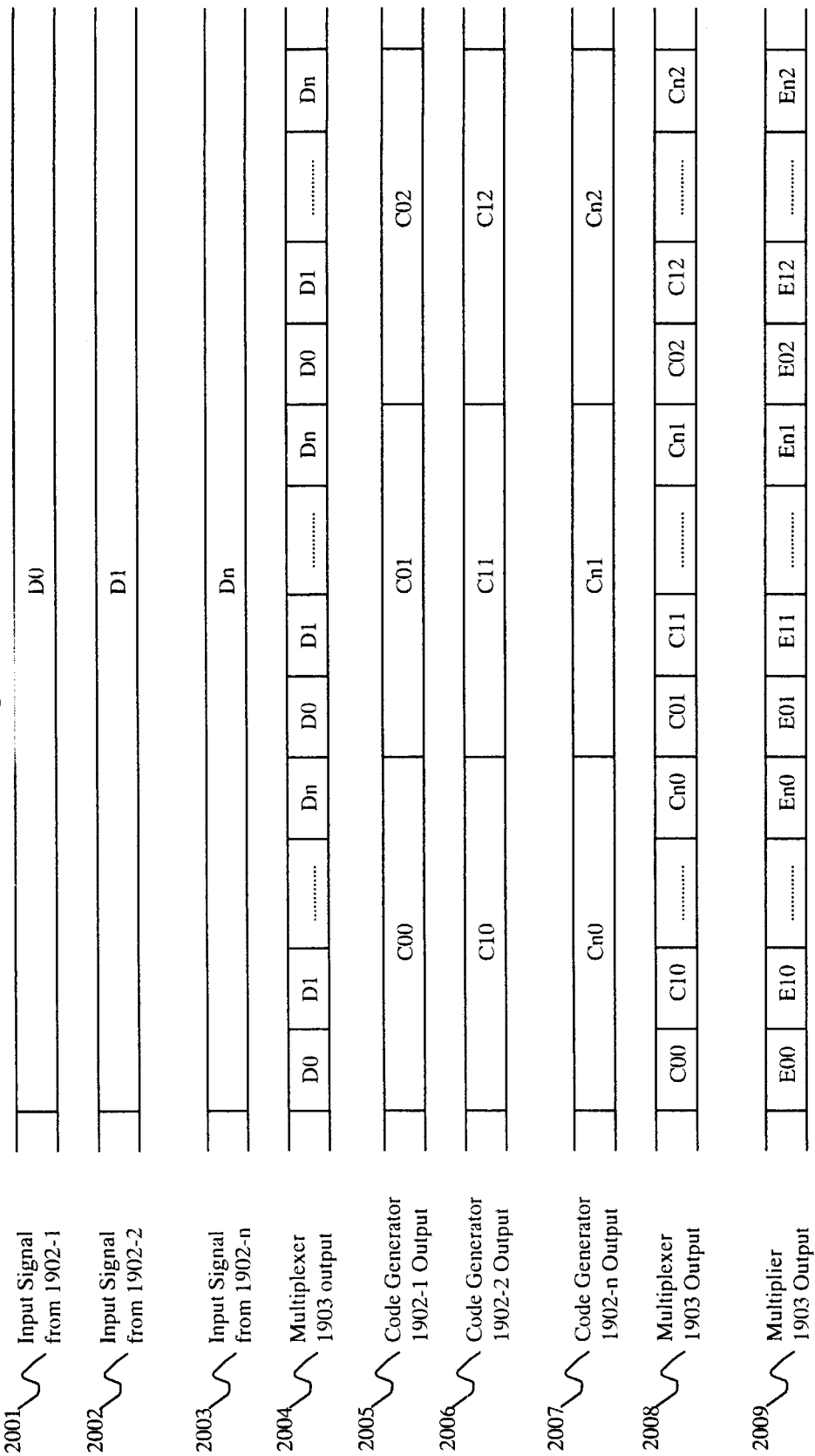
FIG. 19 shows the I/O timing chart of the seventh embodiment.
Figure 20:
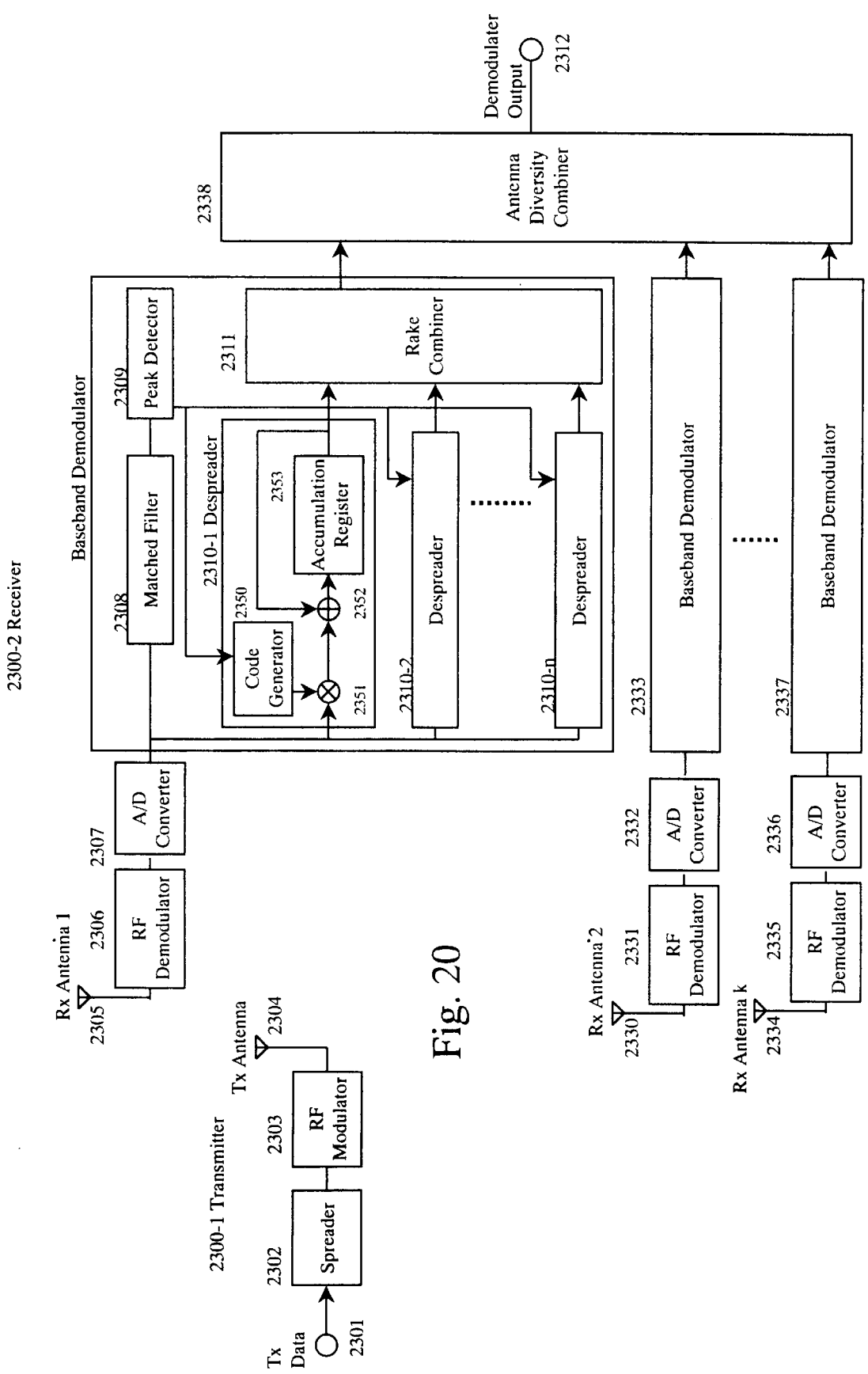
FIG. 20 shows a structure of a code division multiple accessing communication apparatus which uses a conventional matched filter.

In the first to sixth embodiments, the time division signal processing is executed in the receiver. On the other hand, in this seventh embodiment, the time division signal processing is executed in the transmitter. FIG. 18 shows a structure of such a transmitter provided in the communication apparatus of the present invention. FIG. 19 shows operation timings in this embodiment.

Transmit data is put into the spreader 1909 via an input terminal (1901-1 to n). The multiplexers 1903 and 1904 are synchronized in operation with each other. If the multiplexer 1903 selects the input terminal 1901-i, the multiplexer 1904 selects the code generator 1902-i which generates a spreading code for spreading the spectrum of the transmit data from the terminal 1901-i. The multiplier 1905 multiplies transmit data using the spreading code, thereby the spectrum of the transmit data is spread. The spread spectrum transmit signal is then put into the output combiner 1910.

Multiplexed signals are added up and accumulated in both adder 1906 and register 1907. The register 1907 is initially reset to 0. The register 1908 latches each multiplexed signal which is being added up and accumulated so as not to be put out to the D/A converter 1913. Each of multiplexed data D0 to Dn 2004 is multiplied using a corresponding spreading code (C00 to Cn0) 2008 during one chip period, then output as an output signal (E00 to En0) 2009. When the output signals (E00 to En0) are added up and accumulated, the accumulated value held in the register 1907 is transferred to the register 1908. The register 1907 is then reset to 0. The accumulated value held in the register 1908 is put into the radio frequency modulator 1911 via the D/A converter 1913, then converted into radio signal and output to the air via the transmission antenna 1912. After the above time division multiplexing processing is executed at a chip rate during one symbol period, the next data is put into from an input terminal (1901-1 to n).

As described above, in this embodiment, a plurality of transmit data are spread with different codes, thereby spread signals multiplexed in a time division manner are output. FIG. 18 shows a case in which signals from a plurality of channels are multiplexed, but this embodiment can also apply to a case in which I and Q signals are multiplexed with the use of the QPSK. The same calculation is also possible even when the input timing to each input terminal of transmit data is different or even when each transmit data rate is different from others.

Because a plurality of spreading calculations are executed in a time division manner with the use of a multiplier and an adder in this embodiment, the spreader hardware can be reduced in scale.

The structure which includes a plurality of spreading code generators 1902-1 to n and the multiplexer 1904 can be replaced with the structure shown in FIG. 15 (the fifth embodiment) which includes the demultiplexer 1505, the status registers 1502-1 to n, the multiplexer 1503, and the code generator 1504.

According to the present invention, a plurality of base band received signals such as antenna diversity, sector diversity, I (In-phase) signal, and Q (quadrature-phase) signal, etc. are processed by one and the same apparatus in a time division multiplexing manner. Consequently, it is possible to suppress an increase of the hardware scale to be caused by an increase of the number of base band received signals.

Furthermore, in a time division manner it is possible to demodulate, with the use of one demodulator, signals spread with different codes just like received signals from a plurality mobile stations, thereby suppressing an increase of the hardware scale, as well as coping with an expansion of the hardware scale.

What is claimed is:

1. A communication apparatus used for a code division-multiple accessing mobile communication system, comprising:

a radio frequency demodulator for demodulating a plurality of carrier frequency band signals received at a plurality of receiving antennas to a plurality of base band spread spectrum signals;

a multiplexer for multiplexing a plurality of said base band spread spectrum signals in a time division manner;

a matched filter for calculating a correlation between each of a plurality of said base band spread spectrum signals multiplexed in a time division manner and a spread code, thereby outputting a correlation value therebetween;

a peak detector for detecting the predetermined number of peak values selected from peak values of said correlation values in descending order of received power factor; and a despreader for despreading a plurality of said base band spread spectrum signals using a spreading code whose phase is adjusted to a timing detected in said peak detector.

2. A communication apparatus according to claim 1; wherein said multiplexer divides one chip period into n periods (n=number of time division multiplexed periods) and outputs a base band spread spectrum signal received at each of said receiving antennas in each of said divided periods respectively.

3. A communication apparatus according to claim 1; wherein said matched filter is provided with a first shift register for shifting said base band spreading code and a second shift register for shifting said base band spread spectrum signal multiplexed in a time division manner; and said second shift register shifts said base band spread spectrum signal multiplexed in a time division manner according to the number of n registers (n=number of time division multiplexed ones) while said first shift register shifts said spreading code by one register.

4. A communication apparatus according to claim 1; wherein a plurality of said receiving antennas include a receiving antenna composing a plurality of sectors.

5. A communication apparatus used for a code division multiple accessing mobile communication system, comprising:

a radio frequency demodulator for demodulating a plurality of carrier frequency band signals received at a plurality of receiving antennas to a plurality of base band spread spectrum signals;

a multiplexer for multiplexing a plurality of said base band spread spectrum signals in a time division manner;

a matched filter for calculating a correlation between each of a plurality of said time-division-multiplexed base band spread spectrum signals and each of a plurality of spreading codes, thereby outputting a correlation value therebetween;

a peak detector for detecting the predetermined number of peak values selected from a plurality of said correlation values for each of a plurality of said spreading codes in descending order of received power factor; and a despreader for despreading each of a plurality of said base band spread spectrum signals using a spreading code whose phase is adjusted to a timing detected in said peak detector.

6. A communication apparatus according to claim 5; wherein said matched filter is provided with a plurality of first shift registers for shifting each of a plurality of said spreading codes, a selector for outputting each of a plurality of said spreading codes stored in a plurality of said first shift registers selectively, and a second shift register for shifting said baseband spread spectrum signal; and said second shift register shifts each of said time-division-multiplexed base band spread spectrum signals according to the number of n registers (n=number of time division multiplexed ones) while said first shift register shifts each of said spreading codes by one register, and said selector outputs each of said spreading codes stored in a plurality of said first shift registers selectively while said second shift register shifts each of said time-division-multiplexed base band spread spectrum signals by one register.

7. A communication apparatus used for a code division multiple accessing mobile communication system, comprising:

a despreader for despreading a received signal at a plurality of specified timings; and a rake combiner for rake-combining said signals received from said despreader and despread at a plurality of said timings; and said despreader comprises;

a plurality of code generators for generating a plurality of spreading codes at a plurality of said timings respectively;

a multiplexer for multiplexing each of spreading codes generated from a plurality of said code generators in a time division manner;

a register for storing a correlation value between a received signal and said time division multiplexed spreading code for each spreading code;

a multiplier for multiplying said received signal by said time-division-multiplexed spreading code; and an adder for adding a result of multiplication output from said multiplier to a correlation value stored in said register for storing a correlation value with said multiplied spreading code.

8. A communication apparatus according to claim 7; wherein a plurality of said spreading codes are spreading codes assigned to a plurality of terminals.

9. A communication apparatus according to claim 7; wherein a plurality of said spreading codes are spreading codes assigned to a plurality of different base stations or different sectors.

10. A communication apparatus used for a code division multiple accessing mobile communication system, comprising:

a despreader for despreading a received signal at a plurality of specified timings; and a rake combiner for rake-combining said received signal received from said despreader and despread at a plurality of said timings; and said despreader comprises;

a code generator;

a plurality of status registers for storing code data put into said code generator;

a multiplexer for multiplexing each of spreading codes generated from said code generator when code data stored in said status register is set in said code generator at one of said specified timings;

a register for storing a correlation value between said received signal and said time-division-multiplexed spreading code for each of said spreading codes;

a multiplier for multiplying said received signal by said time-division-multiplexed spreading code; and an adder for adding a result of multiplication output from said multiplier to a correlation value stored in said register for storing a correlation value with said multiplied spreading code.

11. A communication apparatus used for a code division multiple accessing mobile communication system for transmitting and receiving a signal modulated by a quadrature phase shift keying (QPSK) method, comprising:

a radio frequency demodulator for demodulating a plurality of received carrier frequency band signals to In-phase signals (I signals) and quadrature-phase signals (Q signals) which are base band spread spectrum signals;

a multiplexer for multiplexing both of said I and Q signals in a time division manner;

a matched filter for calculating a correlation between I and Q signals multiplexed in a time division manner, and an I code for spreading said I signal and a Q code for spreading said Q signal, thereby outputting the result of each of said correlations;

a peak detector for detecting the predetermined number of peak values selected from among a plurality of said correlation peak values sequentially in descending order of received power factor respectively; and a despreader for despreading each base band spread spectrum signal using a spreading code whose phase is adjusted to a timing detected in said peak detector.

12. A communication apparatus according to claim 11; wherein said received power is found as follows;

((I signal×I code)+(Q signal×Q code))$^2$+((I signal×Q code)−(Q signal×I code))$^2$.

13. A communication apparatus according to claim 11; wherein said matched filter is provided with a first register for shifting said I code, a second shift register for shifting said Q code, a selector for selecting between said I code and said Q code, and a second shift register for shifting both I and Q signals multiplexed in a time division manner;

said third register shifts both of said time-division-multiplexed I and Q signals by two registers while said first shift register shifts said I code and said second shift register shifts said Q code by one register respectively, and said selector selects said I code or said Q signal while said third register shifts both of said I and Q signals which are multiplexed in a time division manner by one register respectively.

14. A communication apparatus according to claim 11; wherein said despreader comprises;

an I code generator for generating an I code and a Q code generator for generating a Q code at said timing respectively;

a multiplexer for multiplexing both I and Q codes generated from said I code generator and from said Q code generator in a time division manner;

a first register for storing a correlation value between said I signal and said I code, a second register for storing a correlation value between said Q signal and said Q code, a third register for storing a correlation value between said I signal and said Q code, and a fourth register for storing a correlation value between said Q signal and said I code, a multiplier for multiplying each of said time-division-multiplexed I and Q signals by each of said time-division-multiplexed I and Q codes; and an adder for adding a result of multiplication output from said multiplier to a correlation value stored in a register corresponding to said result of multiplication.

15. A communication apparatus according to claim 11; wherein said despreader comprises;

a code generator;

a first status register for storing I code data and a second status register for storing Q code data, which are put into said code generator respectively;

a multiplexer for setting said I code data or said Q code data selectively in said code generator at said specified timing sequentially;

a first register for storing a correlation value between said I signal and said I code, a second register for storing a correlation value between said Q signal and said Q code, a third register for storing a correlation value between said I signal and said Q code, and a fourth register for storing a correlation value between said Q signal and said I code;

a multiplier for multiplying each of said time-division-multiplexed I and Q signals by each of said time-division-multiplexed I and Q codes; and an adder for adding a result of multiplication output from said multiplier to a correlation value stored in a register corresponding to said result of multiplication.

* * * * *